June 7, 1960

T. H. HART ET AL 2,939,148

PRESSURIZED SUIT

Filed Dec. 15, 1954

INVENTORS
THEODORE H. HART
JAMES F. HART

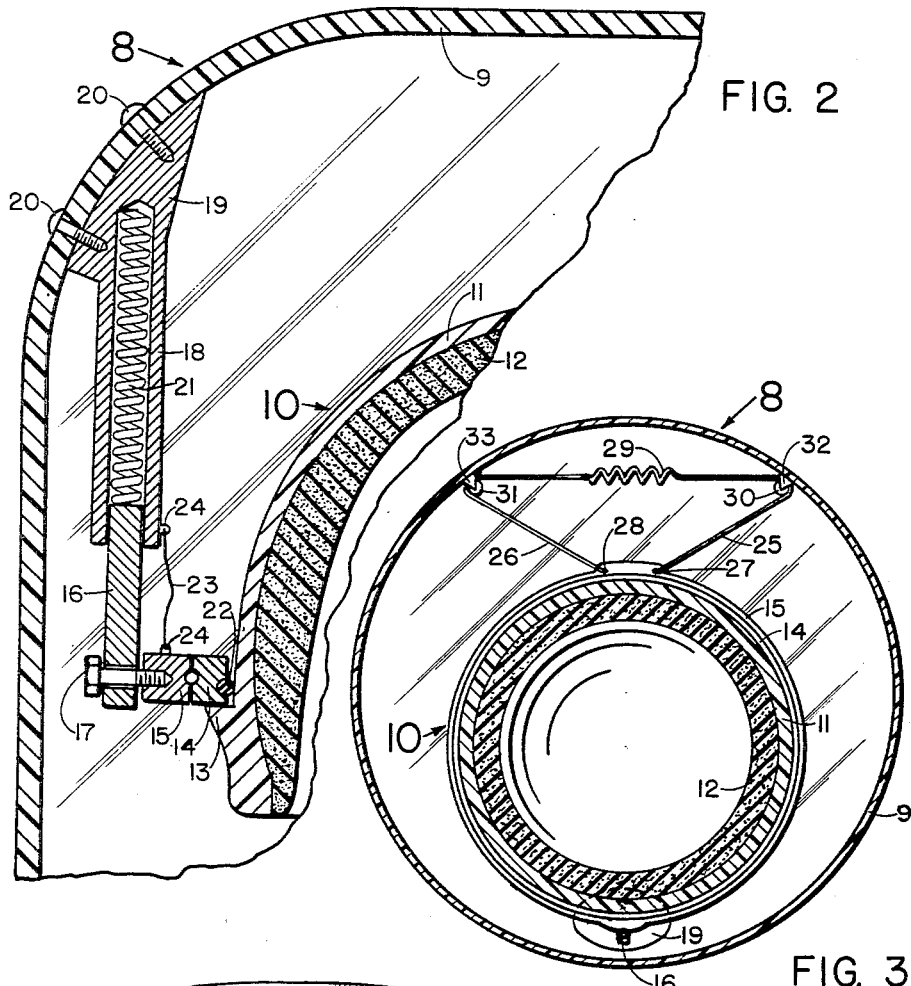
FIG. 2
FIG. 3
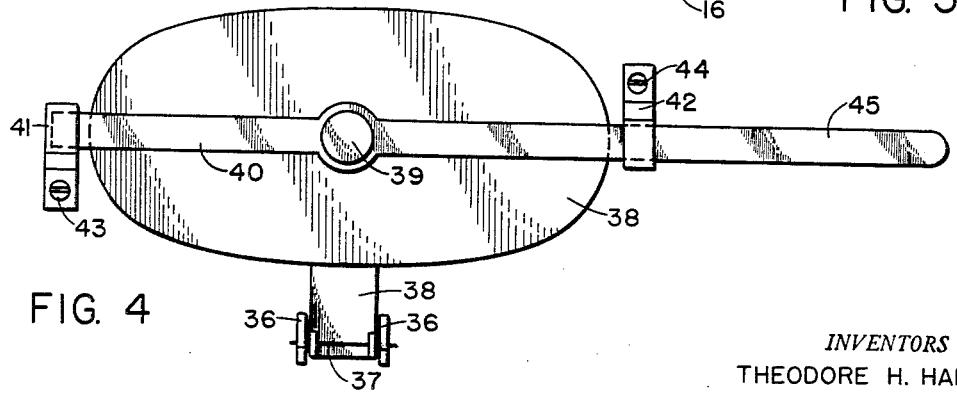
FIG. 4
INVENTORS
THEODORE H. HART
JAMES F. HART

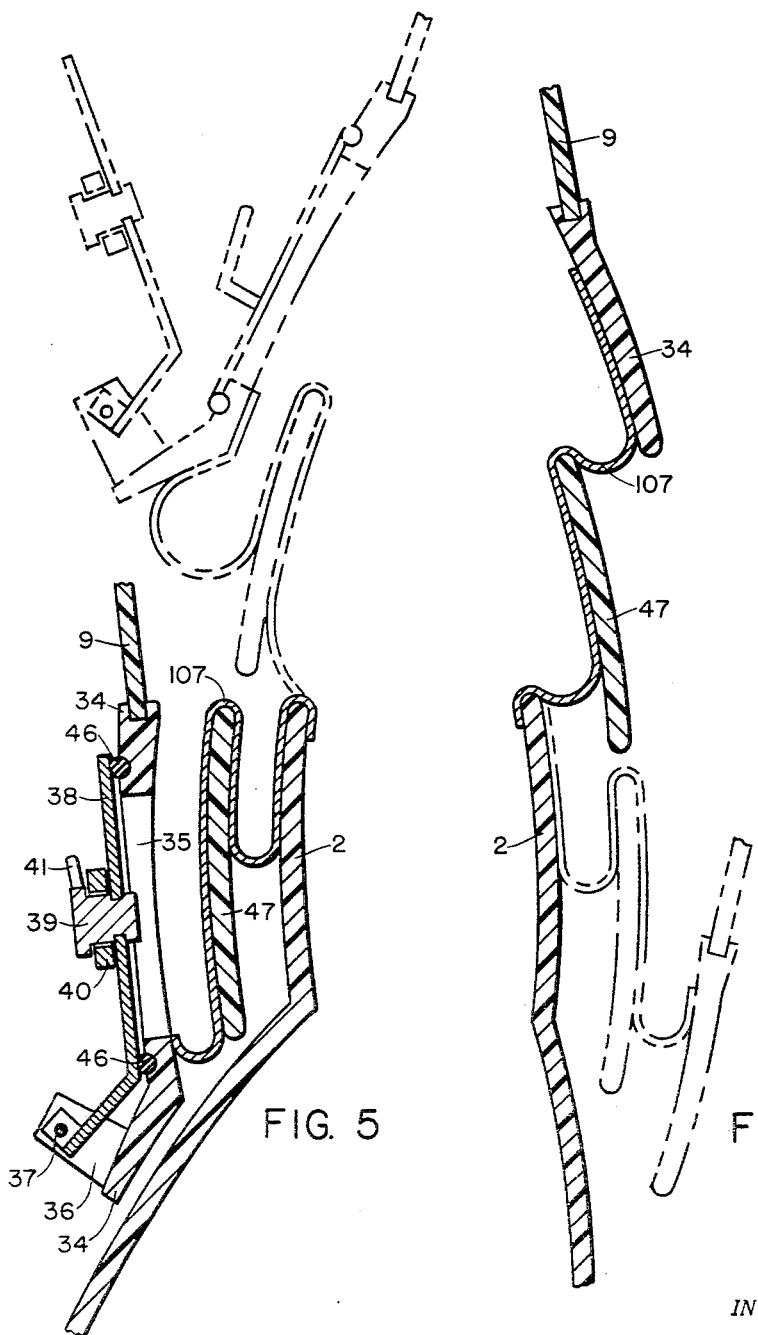

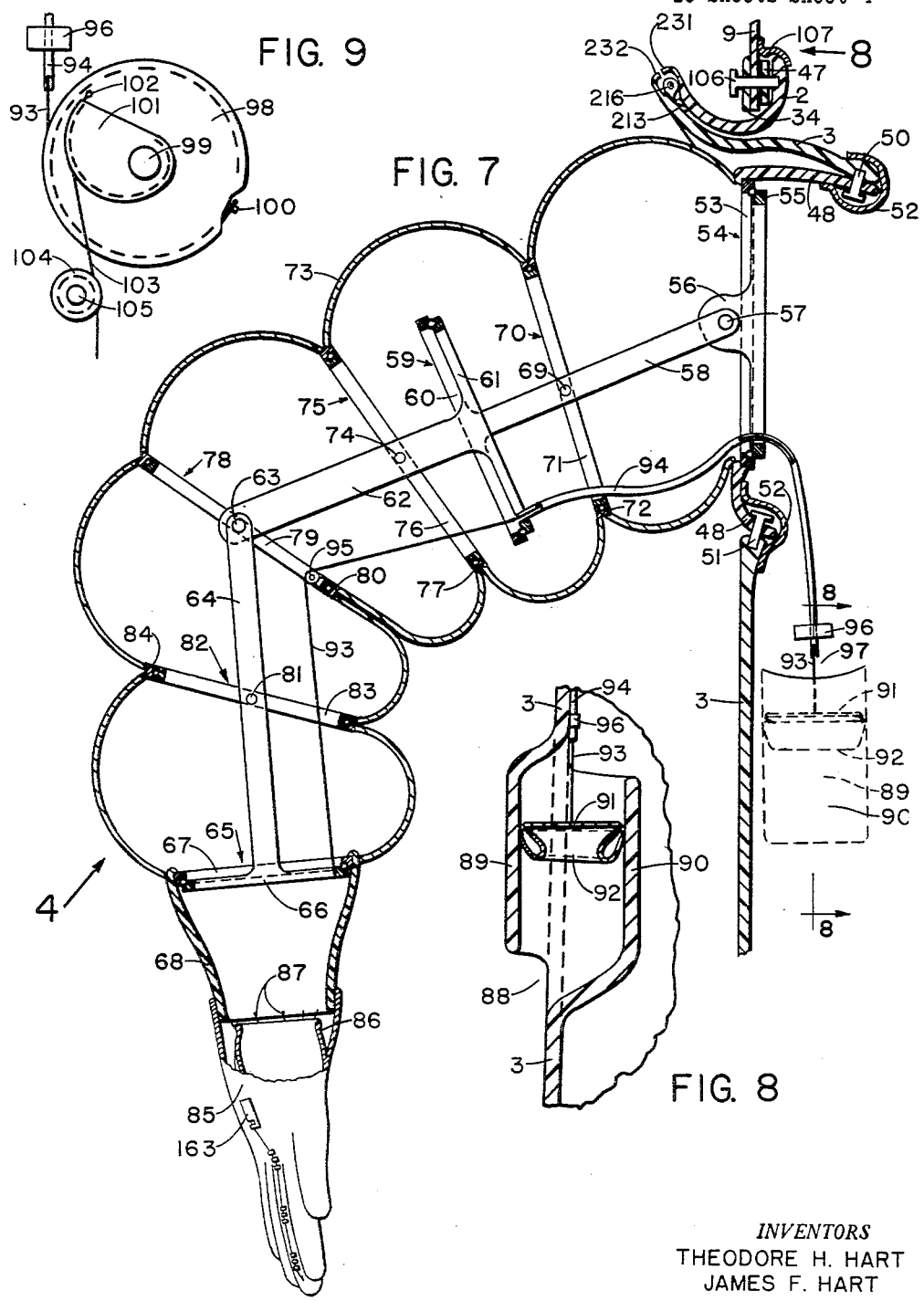

*INVENTORS*
THEODORE H. HART
JAMES F. HART

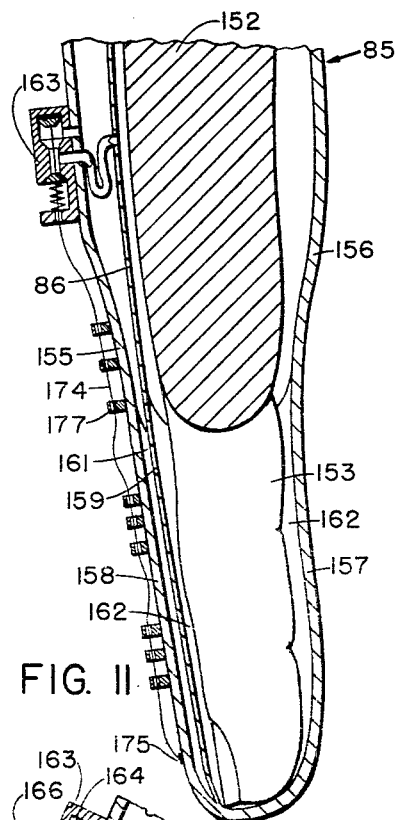
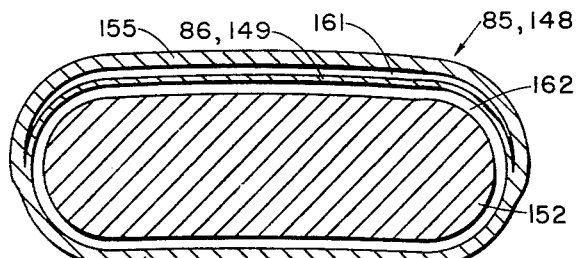
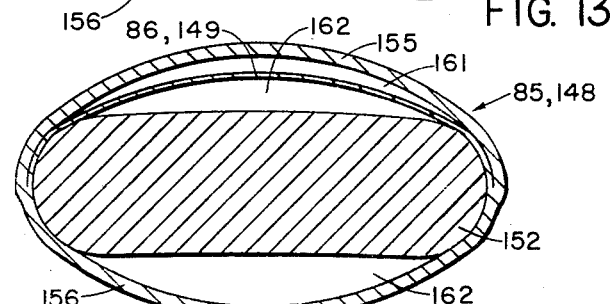
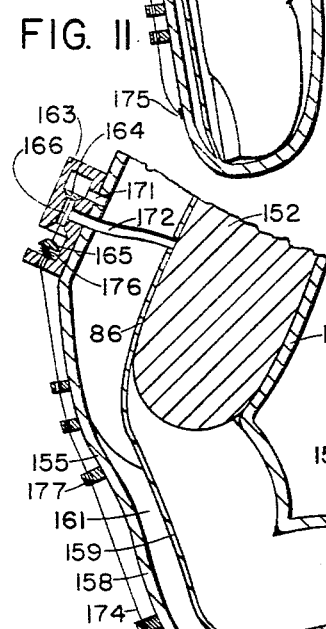
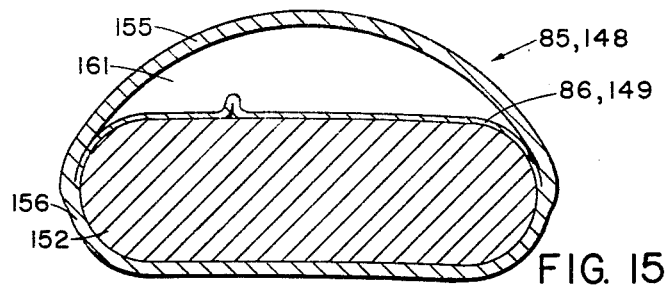
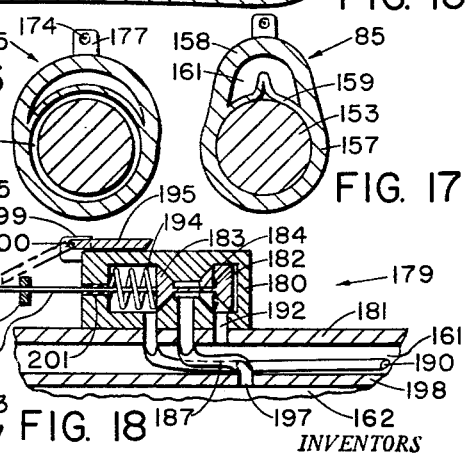
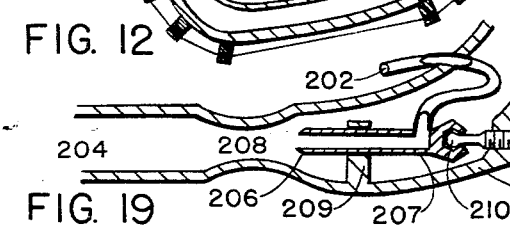
INVENTORS
THEODORE H. HART
JAMES F. HART

*INVENTORS*
*THEODORE H. HART*
*JAMES F. HART*

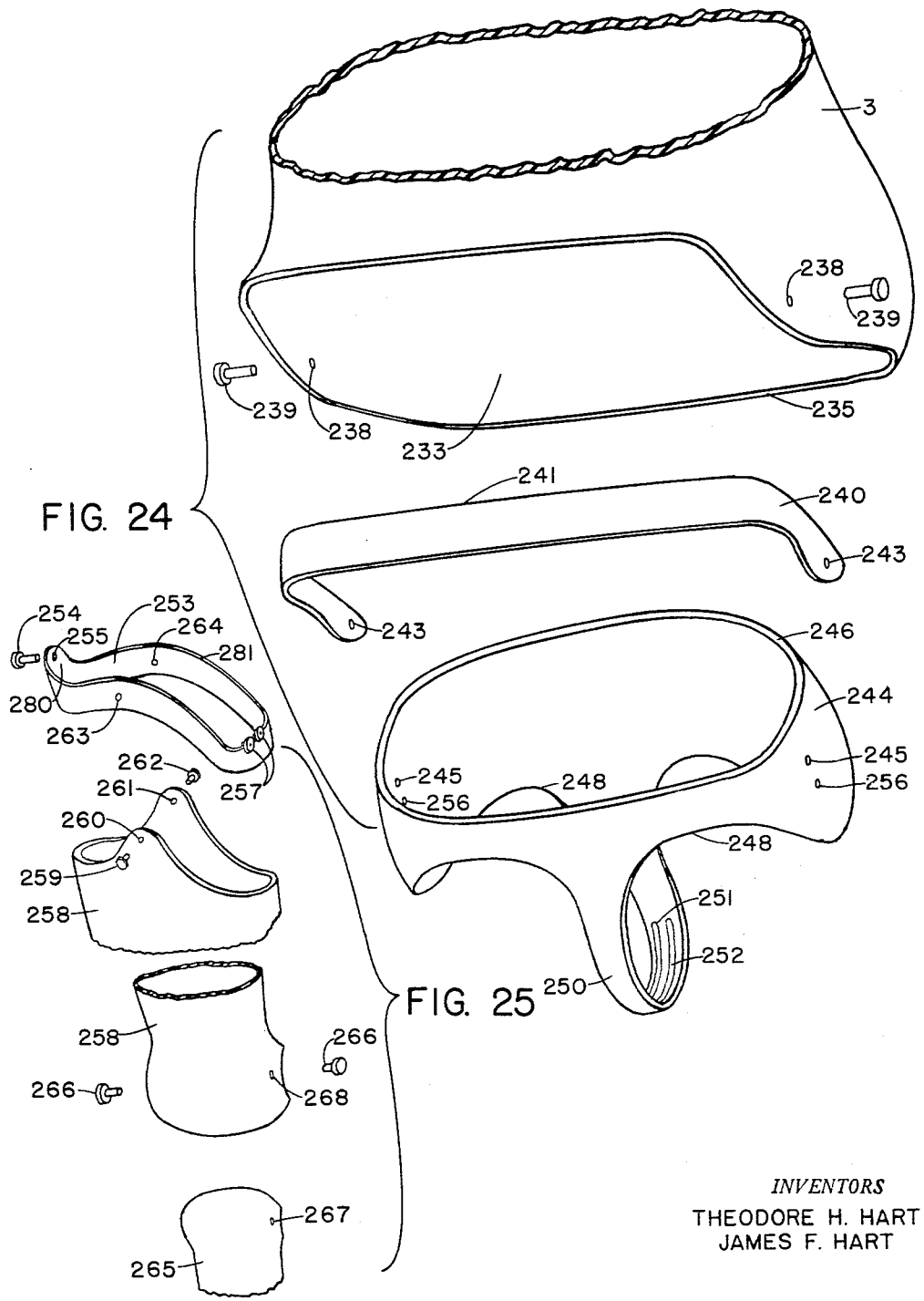

June 7, 1960 T. H. HART ET AL 2,939,148
PRESSURIZED SUIT
Filed Dec. 15, 1954 13 Sheets-Sheet 9

INVENTORS
THEODORE H. HART
JAMES F. HART

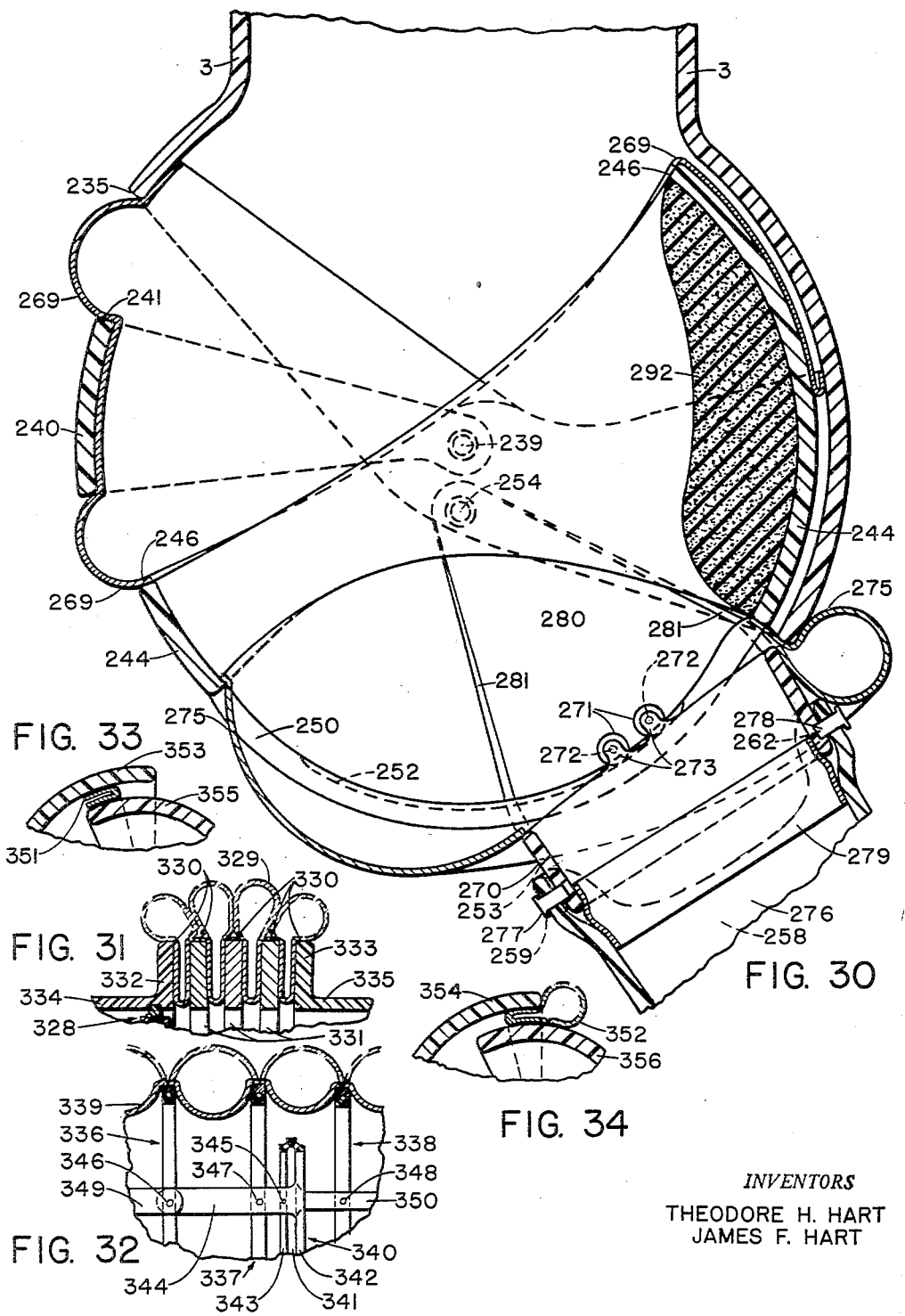

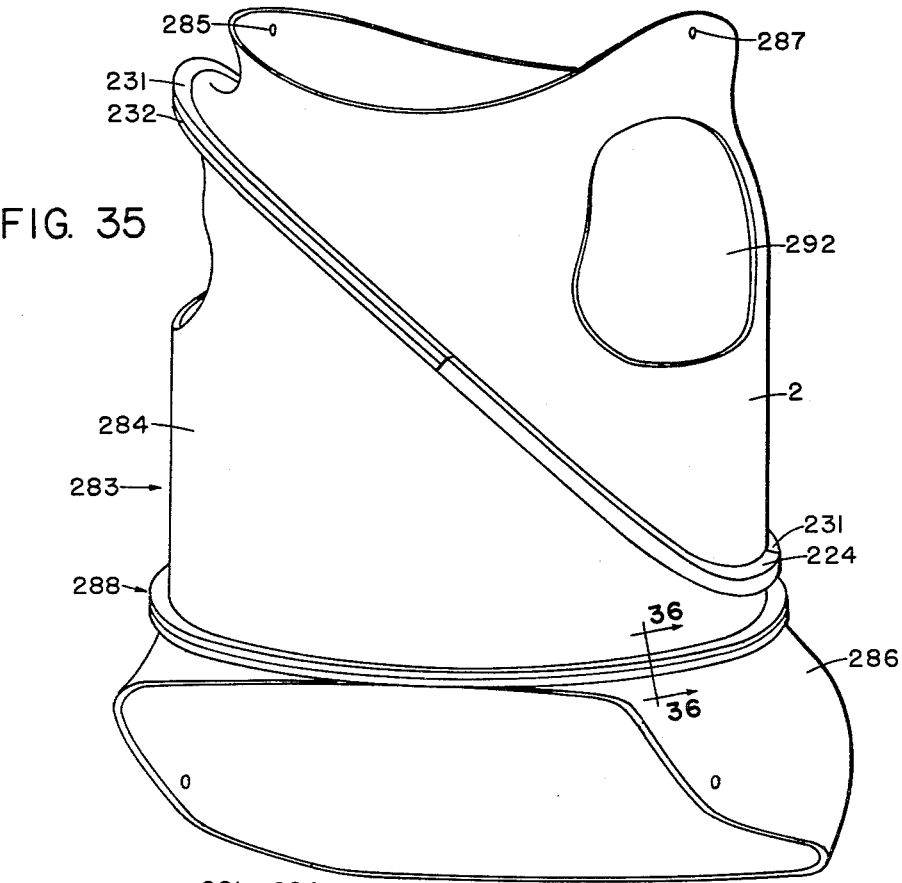

INVENTORS
THEODORE H. HART
JAMES F. HART

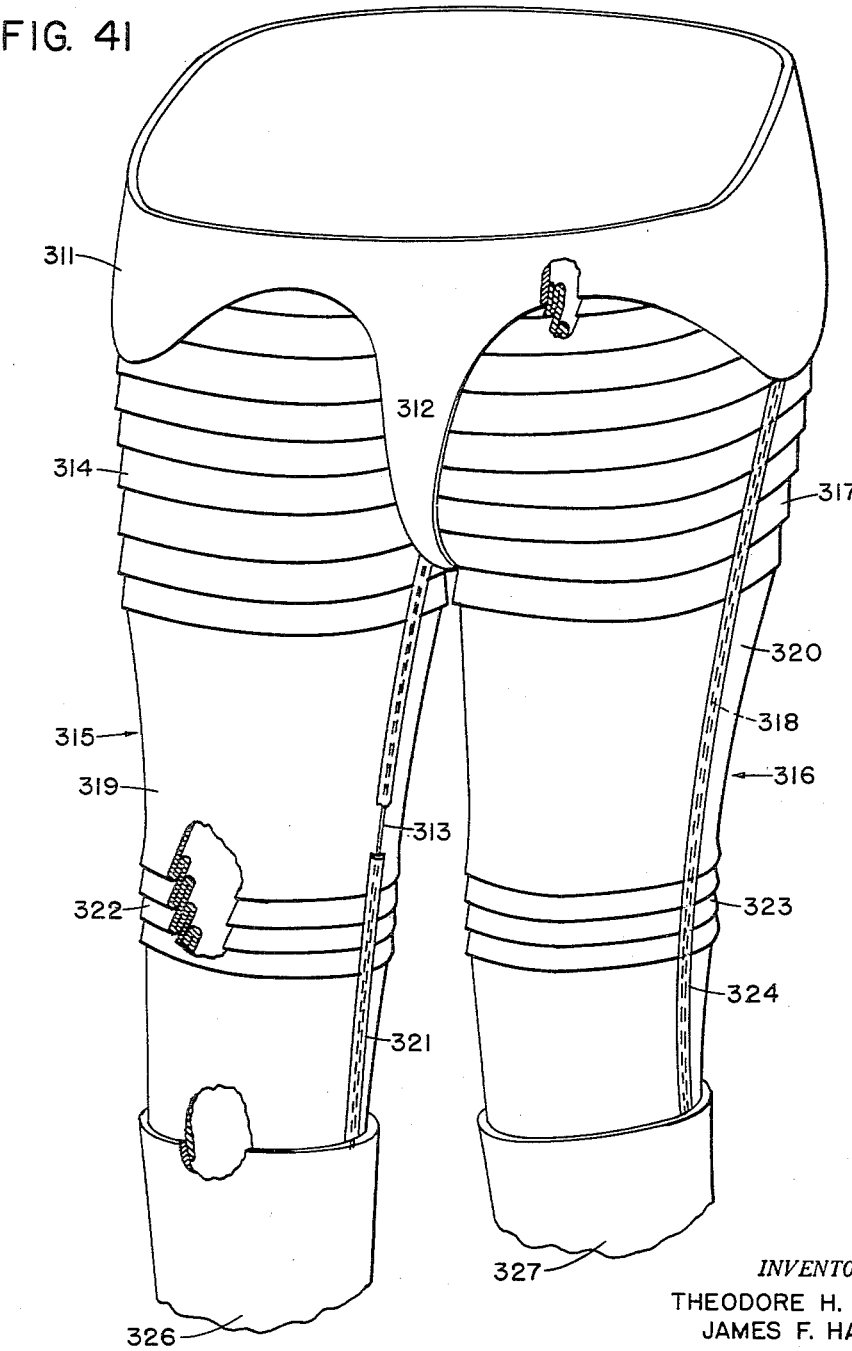

United States Patent Office 2,939,148
Patented June 7, 1960

2,939,148

PRESSURIZED SUIT

Theodore H. Hart and James F. Hart, both of 215 Pearl St., Norristown, Pa.

Filed Dec. 15, 1954, Ser. No. 475,448

5 Claims. (Cl. 2—2.1)

This invention relates to pressurized suits and appurtenances thereto, especially to suits to be worn by aviators, divers, and others who are subjected to containment or perform certain duties under pressurized conditions.

Flight at high altitudes and beyond earth's environs has many advantages; but such flight has been limited heretofore, by many problems, among them, in part, the physiological considerations involved as exemplified by lung alveolar oxygen pressure, aero-embolism or "bends," and body gas expansion or "acute indigestion."

Diving to great depths in liquids has many advantages; such as, retrieving sunken military and commercial material.

Performing duties and/or containment in toxic surroundings is often required; for example, when the adjacent atmosphere contains lethal gases.

Performing duties in a fluid that cannot be contaminated by the gases required for suit occupant breathing and/or ventilation is sometimes desirable; for example, an industrial process that requires entrance by suit occupant into the processed media.

Performing duties and/or containment either all or in part in fluids that vary greatly from suit occupant's temperature has many advantages; for example, as a military omni-environment suit, or the suit or suit portion may be submerged into a fluid of extreme temperature during an industrial process.

One object of this invention is to provide a suit dome with improved downward visibility, with provision for entering the dome wearing a crash helmet, the dome utilizing occupant's head to cause fore and aft movement thereby preventing a feeling of claustrophobia on the occupant's part by maintaining a constant distance between occupant's eyes and front of dome and the dome having a fluid-tight connection to the torso portion of the suit.

Another object is to provide a movable shoulder piece roughly duplicating the movement of the shoulder in relation to the body and joined to the torso by a fluid-tight connection.

Another object is to provide a movable fluid-tight connector between upper and lower arm in which the joint pivots about one axis only and is dependent on rotary seals which permit full twisting movement.

Another object is to provide a movable fluid-tight connector between upper and lower arm in which the joint is an integral part of the whole arm.

Another object is to provide a compensating device to assist in the movement of any joint that should inherently require effort to move due to trapped fluid volume change in the suit during joint movement.

Another object is to provide "feel" in the hand by use of novel types of glove and pressure regulating devices.

Another object is to provide a suit formed in two sections, joined across the body, which may be donned and doffed by the occupant without assistance.

Another object is to provide a closing device that assures uniform sealing of the body halves, notwithstanding the irregularity or extent of the sealing surfaces and that may be operated by one lever that entails for operation just one uniform motion.

Another object is to provide a movable fluid-tight means for rotating the torso portion of the suit with respect to the hip portion.

Another object is to provide a fluid-tight joint at the hips, fully movable in the fore and aft direction, that will permit the suit occupant to sit, stoop and stand.

Another object is to provide fluid-tight joints at the legs, movable fore, aft and sideways.

Another object is to provide fluid-tight knee joints which swing fore and aft.

Another object is to provide a suit in which body and limb members are formed of rigid sections, flexible sections with rigid end portions, or flexible sections with a rigid framework, all sections with flexible sealing means connecting them, and constructed in such a manner as not to ride up on the occupant's body nor distend from occupant's limb extremities when suit is pressurized.

Another object is to provide a suit that is for the most part made of rigid materials for durability and protection to the occupant.

Another object is to provide a suit with novel joint connections between body and limb sections that greatly increases permitted amounts of movement with a substantial reduction in effort.

Another object is to provide a diving suit construction that will remain habitable when internal pressures are either greater or less than external pressures and will enable the occupant to be taken from the water with a greater internal pressure, permitting last stages of decompression to occur in a decompression chamber with suit removed.

Another object is to provide a suit or suit portion operatable in toxic, non-contaminative or intemperate atmospheres.

These and other objects and advantages of the invention will become apparent to those skilled in the art from a consideration of the following description and accompanying drawings which form a part of this specification and in which like numerals are employed to designate like parts throughout the same.

In the drawings:

Fig. 2 is a fragmentary sectional view through the dome on line 2—2 of Fig. 1, looking in the direction of the arrows;

Fig. 3 is a sectional view of the dome along line 3—3 of Fig. 1, looking in the direction of the arrows;

Fig. 4 is a front view of oral-nasal access door arrangement;

Fig. 5 is a fragmentary sectional view along line 2—2 of Fig. 1, showing parts of the front of the suit at the neck in both the head-forward looking-down position, and the head-backward looking-up position. The former position shown as a solid line section and the latter position shown as a phantom line section;

Fig. 6 is a fragmentary sectional view along line 2—2 of Fig. 1, showing parts of the back of the suit at the neck in both the head-forward looking-down position, and the head-backward looking-up position. The former position shown as a solid line section and the latter position shown as a phantom line section;

Fig. 7 is a part sectional view through the right shoulder, right side of neck, and right arm portions of the suit;

Fig. 8 is a fragmentary sectional view of the volume compensating device taken on line 8—8 of Fig. 7;

Fig. 9 is a view of a non-linear compensating accessory device that may be placed at about point 97 in Fig. 7;

Fig. 11 is a fragmentary sectional view of a portion of the right glove showing occupant's middle finger and a pressure regulating means capable of providing "feel" in the hand;

Fig. 12 is a sectional view as in Fig. 11 with the middle finger bent and thereby providing "feel" in the hand;

Fig. 13 is a typical transverse sectional view through the hand showing the glove unpressurized;

Fig. 14 is a typical transverse sectional view through the hand showing the glove pressurized, and pressure compensating means not operative;

Fig. 15 is similar to Fig. 14, showing pressure compensating means operative and providing "feel";

Fig. 16 is a sectional view through glove middle finger with conditions as in Figs. 13 and 14;

Fig. 17 is a view similar to Fig. 16 with conditions as in Fig. 15;

Fig. 18 is a fragmentary sectional view of a modified pressure regulating device;

Fig. 19 is a fragmentary sectional view of a pressure regulating device;

Fig. 24 is an exploded view of the rigid portions of the hip joint construction;

Fig. 25 is an exploded view of the rigid portions of the right leg construction;

Fig. 30 is a sectional view similar to Fig. 26 with the body in an erect position, and the legs in their rear swinging position;

Fig. 31 is a fragmentary sectional view of a typical rotary seal for a pre-inflation type diving suit, with the solid lines representing the sealing bladder immersed at a depth in the water, and the phantom lines showing position of sealing bladder when pre-inflated;

Fig. 32 is a fragmentary sectional view of a typical right arm type as shown in Fig. 7 construction for a pre-inflation diving suit, with the solid lines representing the tubular arm material immersed at a depth in the water, and the phantom lines showing position of tubular arm material when pre-inflated;

Fig. 33 is a fragmentary sectional view of a typical moveable joint section of our flying pressurized suit;

Fig. 34 is a fragmentary sectional view corresponding to Fig. 33 of a typical movable joint section of a pre-inflation diving suit, with the solid lines representing the sealing bladder immersed at a depth in the water, and the phantom lines showing position of sealing bladder when pre-inflated;

Fig. 35 is a view of the torso showing an alternate construction for the lower body at the waist consisting of a rotary seal integral therewith;

Fig. 36 is a sectional view on the line 36—36 of Fig. 35, looking in the direction of the arrows;

Fig. 41 is a view of the rigid portion of hip member with alternate leg construction added thereon.

For the purpose of facilitating a logical method of expounding the pressurized suit's features, we have endeavored in the following description to categorize the invention as a flying pressurized suit with four basic modifications. The basic modifications are as follows: a diving suit, a toxic suit, a non-contaminative suit, and an intemperate suit. Certain features among these modifications will often be duplicatory in nature, so for the sake of clarity we will attempt to describe the flying pressurized suit first, and later the others with reference to the flying pressurized suit whenever such procedure enables a reduction in wordage without a lack of understanding.

A flying pressurized suit should possess desirably certain characteristics and be capable of performing certain functions as described more fully hereinafter for meeting the requirements of extended and safe service at high altitudes. Such service may be exemplified by an occupant's manipulation of the controls and accessories of a military airplane, for example, wherein extensive freedom and flexibility of movement is desirable and wherein undue bulkiness of the suit is objectionable since the space within the operating compartment is generally of limited extent, and also by such actions as sitting, standing, bending, stooping and reaching.

Our invention provides means for obtaining the desired extensive freedom and flexibility of movement of adjacent portions of the flying pressurized suits, whether such movement be turning or bending, or both in combination and provides also for a fluid-tight structure which may include rotatable means for inter-connecting an elbow joint to an upper part of the limb covering.

The invention provides a suitable rotatable connector including fluid-tight sealing means for inter-connecting a limb portion with a torso portion of the flying pressurized suit for providing relative full-circle rotating movement between the torso and the upper limb portion and relative limited rotating movement between the hip portion and the lower limb portions. Further, the invention provides for an effective construction of the flying pressurized suit at the region of the hips of the occupant whereby free flexible movement between the respective lower limb portions and the hip portion may be obtained without undue bulging of the hip portion especially at the front wall thereof.

Means for occupant's unassisted entry and exit from our flying pressurized suit may be provided by a transverse diagonal split in the torso portion as hereinafter described, and may include the addition of other suitably functional detachable connectors.

Also our invention provides three methods for obtaining "feel" in the hand portion of the flying pressurized suit when the suit is pressurized. The utilitarian method may be determined by suit operational conditions and occupant personal preference.

Figure 1:
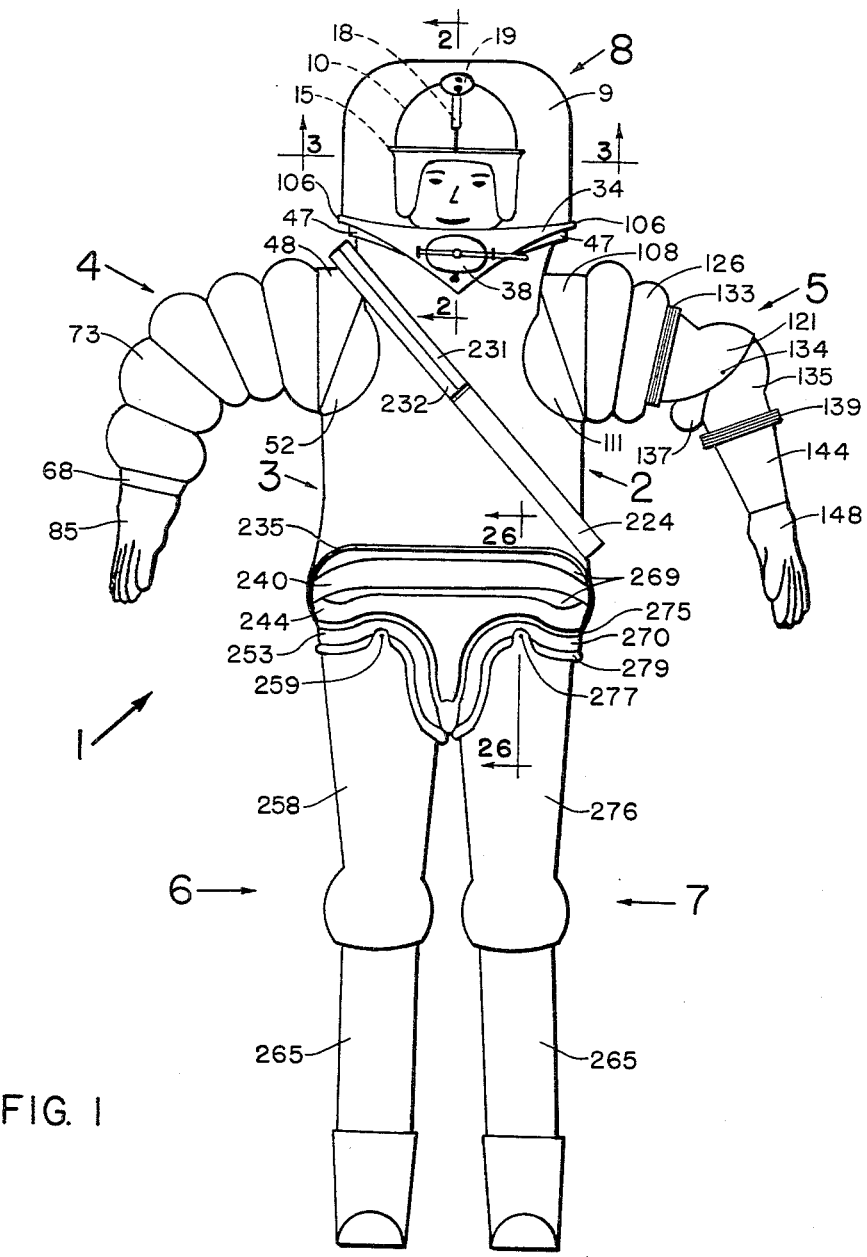
Fig. 1 is a front view of one embodiment of the suit of this invention.

In the illustrative embodiment of the invention, Fig. 1 shows the flying pressurized suit 1, comprising upper body section 2, lower body section 3, right arm section 4, left arm section 5, right leg section 6, left leg section 7, and dome section 8.

In Fig. 2 the dome section 8 is a bell 9 of transparent material; for example, clear polyester resin. Within the dome 8 is a helmet 10 including an inverted cup or bowl portion 11 which may be composed of suitable rigid material. The helmet 10 has a lining 12 of low resilience material; for example, sponge rubber. Near the middle of the cup or bowl 11 is a shoulder 13 upon which rests the inner race 14 of an anti-friction bearing, the outer race 15 of which is mounted on a post 16 by means of pivot screw 17. The post 16 slides within tube 18 having foot 19 mounted on bell 9 by means of screws 20. Compression spring 21 in post 18 exerts light pressure on the post 16 transmitting the pressure to helmet 10. A ring 22 of elastomeric material; for example, rubber cord, is affixed to the radial groove in race 14. Flexible member 23 of piano wire, for example, connected to tube 18 and race 15 by means of staples 24 prevents accidental escape of post 16 from tube 18.

In Fig. 3 a wire or cable 25 is attached to the aft portion of outer race 15 at point 27 and another such member 26 is similarly attached at 28. The two members 25, 26 are connected by a tension spring 29. These wire or cable members 25, 26 are trained respectively over pulleys 30 and 31, respectively mounted on brackets 32 and 33 suitably secured on the inside of bell 9.

Fig. 4 is a fragmentary front view of oral-nasal access door which is shown in sectional view in Fig. 5 in which peripherically circumscribed and bonded to bell 9 is a ring 34 of rigid material; for example resin impregnated fiber glass, but may be made of other suitable plastic or metal. The forward portion of ring 34 is provided with an oral-nasal access opening 35. Mounted on ring 34 near the lower edge of opening 35 are a pair of ears 36. Pivoted on ears 36 by means of a pivot pin 37 is a door 38 of metal or other suitable material, and pivoted on the door 38 at pivot member 39 is a locking lever 40. The locking lever 40 is adapted to engage under lugs 41 and 42 respectively, which latter are attached to ring 34 by screws 43 and 44. Lever handle 45 is provided for manipulating lever 40, and an elastomeric ring 46 is provided to form a seal between door 38 and ring 34.

Figure 10:
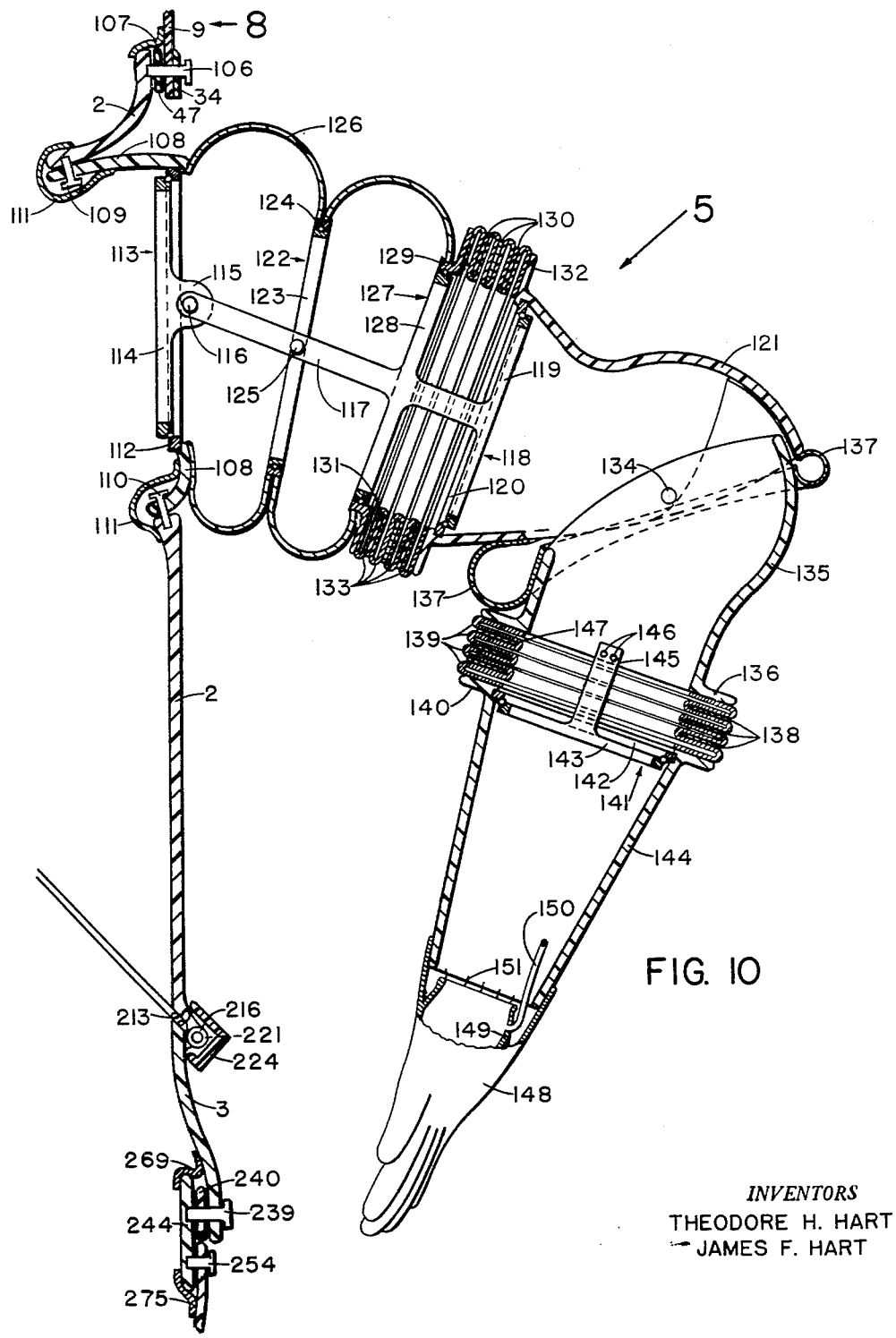
Fig. 10 is a part sectional view through the left shoulder, left side of neck, left arm, and left hip portions of the suit.
Figure 20:
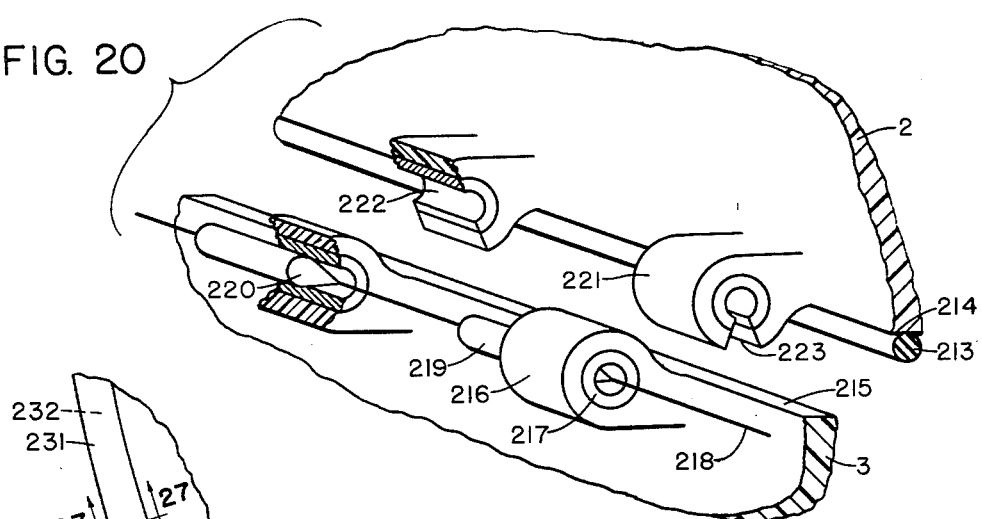
Fig. 20 is a fragmentary sectional view of a portion of a means for sealing body sections, shown with the sections separated.

In Figs. 5 and 6 and with occasional reference to Figs. 1, 7 and 10 is shown the neck joint in which adjacent to ring 34 is neck joint ring 47. Ring 34 is flexibly connected to neck joint ring 47 and subsequently flexibly connected to upper body section 2 by means of a flexible fluid-tight material 107; for example, rubber impregnated woven fabric. The material 107 is suitably bonded where necessary to both rings 34, 47 and to the upper body section 2. In Figs. 5 and 6 rings 34, 47 are shown by a solid section when bell 9 is in the head-forward looking-down position and rings 34, 47 are shown by a phantom section when bell 9 is in the head-backward looking forward and up position. Door 38 is closed and sealed in solid section view and partially open in phantom section view. Description of the neck joint action is related later.

To further functionally amplify the portions of the suit as shown in Figs. 2 through 6, a comprehensive explanation of the operation will immediately follow; the occupant dons helmet 10 and secures and adjusts helmet 10 to occupant's head by means of helmet chin strap (not shown). At this time or before he dons suit audio devices (optional and not shown) and suit breathing apparatus (not shown). Occupant then takes upper body section 2 with dome 8 affixed, places it over his head, and lowers it until inner race 14 of dome 8 rests against shoulder 13 of helmet 10. Inner race 14 is desirably held by light pressure against shoulder 13 during all head motions through the direct action of spring 21 in the front of dome 8 and by a downward tension component of the cables 25, 26 in the rear of dome 8. This light pressure hereinabove described enables fore and aft head motion to be transmitted directly to the dome 8 which in turn will cause the dome 8 to rotate about an axis hereinafter described. The rotating or tilting of the dome 8 allows much improved visibility especially in head-forward looking-downward position in comparison to a fixed dome of similar outside dimensions. Also the dome 8 hereinbefore described dispenses with the difficulty of movement and other drawbacks of the integral helmet type (not shown) in which the dome is dispensed with and a fluid-tight close fitting helmet is used.

When the suit occupant wishes to look from side to side, he turns his head, which causes both helmet 10 and inner race 14 to mutually turn. This is virtually an effortless maneuver as contrasted to the integral helmet type since the only restraining action is due to the bearing race friction. When the head is in the turned position, and the occupant wishes to then look up with respect to his now assumed direction of facing he moves his chin forward and forehead backwards again with respect to his now assumed direction of facing rotating the helmet 10, bearing 14, 15, and pivot screw 17 around an axis through the center line of pivot screw 17 causing himself to be looking upwards and sidewards. There is also means provided in the dome to move the head a slight amount sideways by the cables 25, 26 traveling around pulleys 30, 31 which permit a sideward movement by, for example, a fore-shortening of the distance from point 28 to pulley 31 which then permits the rear of ring 15 to move sidewards and the inner ring 14 to move sidewards exactly half the total distance the rear of ring 15 moves due to the fact the front of ring 15 pivots only.

The front of ring 15 and the post 16 pivot about an axis through the centerline of post 16. This enables the occupant to move his head closer to the side of bell 9 when looking downward either to his right or left; for example, looking at an instrument console in an airplane. This allowable sideways movement also prevents the occupant's neck from being uncomfortable when his head is in a looking to the side and upwards position. The hereinabove described motions, singly or in combination, afford the occupant a wide range of vision with a minimum of effort.

As soon as the suit occupant dons upper body section 2 and until the breathing apparatus functions, the suit occupant will have to rely on outside air for breathing, and this air is obtained by opening the helmet door 38 to permit fresh outside air into the dome inclosure. Also the door 38 permits entry of suit occupant's hand through the oral-nasal access opening 35 when the suit is unpressurized, which permits adjustment of breathing apparatus and affords opportunity to alleviate other oral-nasal discomforts. Also this door 38 may be fitted with such devices to permit pressurized feeding (not shown) of liquids to suit occupant while the suit is pressurized.

In dome type pressurized suits claustrophobia is a great hazard causing impairment to the occupant in performing his duties. The feeling of claustrophobia is traceable to the fact that in a dome type head piece, the occupant is made aware of containment in the dome when he moves his head and markedly notices the presence of the dome because of its relative movement with respect to his eyes. However, in instances where the dome is generally maintained at the same distance, the occupant tends to disregard the dome and its attendant claustrophobic feeling. Also the feeling of claustrophobia is traceable to the fear of smothering, which the suit occupant is fully aware of should his suit breathing supply fail, and this is especially so when he knows he cannot doff the suit without assistance from others, and this claustrophobic feeling is even more magnified if there is no oral-nasal access door or equivalent to permit entry of fresh air.

Our invention substantially reduces the possibility of occupant claustrophobia due to having a dome 8 of almost constant eye to surface of dome distance by virtue of the dome's 8 tilting capabilities hereinafter described, and also being occupant doffable as hereinafter shown and having an oral-nasal access door 38.

Figures 7, 8 and 9 show one method of arm construction in which arm movement is gained by transpositioning the axis at shoulder and elbow with only the inner rigid structure rotating. This type arm construction is completely fluid tight, but requires comparatively considerable effort to bend and results in this type arm construction being not too practical for continuous movement when pressurized; for example, a pilot manipulating the controls of an airplane during continuous airplane maneuvering to eliminate this effort, we have added a compensating device which is hereinafter described. The shoulder section or diagonally truncated ring 48 is mounted in a nearly circular arm opening in the lower body section 3 by means of pivots 50, 51 in order to permit extended to-and-fro arm movements transverse to the body. Pivot 50 is located as close to the occupant's neck as possible in order to duplicate the human bodies natural shoulder movement. Shoulder section 48 is flexibly connected to lower body section 3 by means of a flexible fluid-tight material 52. This material 52 is billowed or ballooned in its fore and aft portions to permit a large degree of movement of the shoulder section 48 with respect to lower body section 3. In order to permit substantially normal rotary or torsional movement of the arm section at the shoulder, the outer race 53 of an anti-friction thrust bearing 54 is mounted on and bonded to the shoulder section 48.

The inner race 55 of bearing 54 has a pair of ears or foreshortened arms 56 spaced on each side but the arms may or may not be diametrically opposed. The arms 56 may be offset so that an axis through the ears is a chord of a circle with respect to bearing 54. This offset causes the neutral position of the upper arm section when pressurized to be at an acute angle to the bearing 54 instead of perpendicular. This angularity tends to be maintained regardless of the direction the upper arm is rotated. The amount of angularity is determined by amount of offset of the axis, and the preferable amount of offset may be ascertained by experimentation to satisfy the occupant and give him the most natural arm at the shoulder position.

This joint is not effortless, but does allow movement to a greater or lesser angle with respect to the neutral pressurized angle. Unpressurized, the arm section at the shoulder is not restricted and has free effortless bending movement. Both pressurized and unpressurized the arm at the shoulder will rotate freely with very little effort.

The arm at the shoulder as hereinabove described rotates on bearing 54 and pivots on pins 57 about arms 56 by means of a pair of arms 58 which are made integral to and join outer race 60 of anti-friction thrust bearing 59 at diametrically opposed positions. Bearing 59 is interposed approximately halfway between the shoulder section and the elbow in order to facilitate rotational movement of the lower arm portion. Inner bearing race 61 may be attached to or made integral with a pair of diametrically opposed arms 62. An elbow pivot formed by pins 63 joins arms 62 and arms 64, the latter forming part of the rigid framework of the forearm portion of the flying pressure suit. The lower end of arms 64 may be attached to or made integral with the inner race 66 of an anti-friction thrust bearing 65, the outer race 67 of which is bonded to the wrist element 68 which latter comprises a ring, or preferably a frusto-conical member of rigid material; for example, resin impregnated fiber glass.

Connected to arms 58 at diametrically opposed positions by means of pivot pins 69 is the inner race 71 of a radial anti-friction bearing 70 the outer race 72 of this bearing is bonded with a suitable adhesive to a tubular covering 73 of flexible fluid-tight material; for example, rubber impregnated woven fabric. This tubular cover structure provides a flexible and yieldable covering for the occupant's arm. Arms 62 are pivotally connected by pins 74 to the inner race 76 of an anti-friction radial bearing 75, the outer race 77 of which is bonded to the tubular covering 73. The pivot pins 63 are connected to the inner race 79 of an anti-friction radial bearing 78, the outer race 80 of which is bonded to the tubuar covering 73. Arms 64 are connected by pins 81 to the inner race 83 of an anti-friction radial bearing 82, the outer race 84 of which is bonded to the tubular covering 73. The tubular covering 73 is bonded with a suitable adhesive at its longitudinal extremities to the wrist element 68 and to the shoulder section 48.

The tubular covering 73 is fabricated in a billowed or ballooned manner between respectively wrist element 68, bearings 82, 78, 75, 70, and shoulder section 48. The description of four anti-friction radial bearings does not qualify the arm as such, for to basically functionally accommodate the arm, the arm may consist of an anti-friction radial bearing at the elbow; for example, bearing 78 and a plurality of anti-friction radial bearings in both forearm and upper arm with the tubular covering; for example, covering 73, suitably attached to each bearing.

The modus operandi of this above type arm construction for a flying pressurized suit follows to a great extent the natural movements of the arm and shoulder, in fact, the rigid framework structure 48, 58, 62, 64 may be likened to the human bone structure, and the tubular covering 73 including shoulder section 48 and flexible material 52 may be likened to an outer skin. The movement of the right arm section 4 at the shoulder and elbow may be universal in that an arm portion may bend in any direction with respect to an adjacent arm or shoulder portion.

At the lower end of the wrist element 68 is attached by a suitable bonding means, a glove member 85. The glove dorsal and wrist liner 86 is flexibly suspended from the wrist element 68 by fiber members 87 composed of, for example, nylon cord which prevent the liner from being pushed into the glove fingers by the occupant's hand. This liner 86 is adapted to fit snugly about the wrist of the occupant of the suit.

The bending of the arm 4 at the elbow, during pressurized use, causes a decrease in the volume of air contained in the sleeve, which in turn induces a resistance to bending roughly proportional to the decrease in volume. To reduce the bending resistance at the elbow, a volume compensating device may be provided. This device may include an opening 88, as shown in Fig. 8, in the back of the lower body section 3 of the flying pressure suit. On either side of this opening 88 are spaced outer wall section 89 and inner wall section 90. Wall sections 89, 90 form a substantially tubular enclosure within which a diaphragm 91 operates. A bladder 92 of flexible fluid-right material; for example, rubber impregnated woven fabric, is bonded with a suitable adhesive to the diaphragm 91 and to wall sections 89, 90 to form a seal between the outside and inside of the suit pressures. A cable 93, as shown in Fig. 7, is connected between the diaphragm 91 and bearing race 66. This cable 93 is trained over grooved pulley or anti-friction device 95 mounted on bearing race 79. Between bearing 59 and the lower body section 3, the cable passes through a flexible tube 94. Tube 94 is fastened to bearing race 61 and passes along the inner side of bearings 70, 54 and is anchored to the back of lower body section 3 by means of clip 96 suitably bounded to inner wall of the suit. As the arm 4 bends, the volume of air in the arm 4 is reduced, but the diaphragm 91 moves by means of the hereinabove described linkage to maintain the overall suit volume the same. A volume compensating device (not shown) similar to the above described compensating device may be used at the shoulder with a cable (not shown) similar to cable 93 attached to bearing race 60 and passing into a flexible tube (not shown) attached to bearing race 55 and both cable (not shown) and tube (not shown) passing to volume compensating device (not shown) similar to Fig. 8.

It may be desired to have the elbow bent at some predetermined pressurized angle with very slight effort required to move it from this position. Also it may develop that the volume change in the arm is not consistent with the volume compensating change in the diaphragm during arm 4 movement. To correct for either of the two above contingencies, a non-linear compensating accessory device as shown in Fig. 9 may be inserted in the suit appended to cable 93 and tube 94 at about 97, Fig. 7.

This device as shown in Fig. 9 consists of a grooved pulley 98 rotatably mounted by means of pin 99 on the back wall of lower body section 3. Cable 93 instead of being attached to the diaphragm 91 is now secured to pulley 98 by means of a pin 100. Fixedly mounted on the side of pulley 98 is a grooved cam 101 which has a pin or hook member 102 mounted thereon. The cam 101, the grooved surface of which, may assume any contour that will accomplish the desired compensating means. Cable 103 is attached to member 102 and passes over grooved pulley 104 whose right edge as viewed in Fig. 9 is tangent to a perpendicular (not shown) from the center of the diaphram 91. The grooved pulley 104 is rotatably mounted by pin 105 on the back wall of lower body section 3. Cable 103 would be attached to diaphragm 91 in lieu of the attachment of cable 93 as shown in Fig. 7.

Dome 8, neck joint ring 47, and upper body section 2 are movably interconnected by means of pivot pins 106 bonded in upper body section 2. Flexible fluid-tight material 107 forms a seal between bell 9 and upper body section 2 by being bonded thereto with a suitable adhesive. Flexible fluid-tight material 107 circumscribes the edges of bell 9 or ring 34, ring 47, and upper body section 2 as shown in Figs. 5, 6, 7, and 10, the transition from lateral portions to the longitudinal portions being harmonious with the contours of the rigid suit sections. Dome 8 may rotate in a fore and aft direction on pivot pins 106, the axis through pivot pins 106 roughly coinciding with the fore and aft bending axis of the occupant's neck, thereby affording a fixed distance relationship between the occupant's eyes and the bell 9, which in turn, decreases the possibility of claustrophobia as hereinabove described.

In Figs. 5 and 6 the flexible fluid-tight material 107 peels away or rolls up from one surface and unrolls onto the opposite corresponding surface during joint articulation, such movement shown in one extreme position of joint movement as solid lines and shown in the other extreme position as phantom lines. There is no scraping or rubbing of the material 107 against any of the joint sections consisting of portions of dome 8, ring 47, and upper body section 2, and therefore there is no resistance to joint articulation from friction of the material 107 rubbing against the joint sections. The joint construction of Figs. 5 and 6 rolls up the material 107 on one side of the joint at the same rate as it unrolls on the opposite side with the centroid of the area of the trapped air on the centerline of the joint pivot axis through pins 106. With the centroid of the area on the centerline of the joint, the trapped air volume of the joint remains the same during joint movement, therefore the joint does not expand or compress the trapped air in the joint during articulation, thereby the joint is effortless to move with regard to volume changes in the joint, the joint tending to move to the position of greater volume therein if the pressure within the joint is greater than the external pressure and conversely. The ring 47 permits a greater movement of the joint for the same joint internal passage size and the same joint overall size. The addition of more rings similar and concentric with ring 47 would further increase the maximum amount of joint movement. As shown in Fig. 1 the following joints are basically the same type as shown in Figs. 5 and 6: the hip joint with the U-shaped member 240 equivalent to a truncated version of ring 47; knee joints, upper leg sideways movement joint, left elbow joint, and shoulder joints all with the equivalent to ring 47 removed.

Fig. 10 shows another method of arm construction in which arm movement is gained at the shoulder and upper arm roughly the same as in Fig. 7, however, when the forearm is bent and rotated with relation to the upper arm, the whole elbow rotates by virtue of fluid-tight virtually effortless rotary seals, hereinafter described. Also the elbow joint is virtually effortless in bending and does not require any volume compensating means. Fig. 10 is a transverse sectional view through the suit including a left arm section 5, left hip section, suit closing device at its lower extremity, and the left neck joint. The left arm section 5 has a shoulder or diagonally truncated ring 108 which is mounted in a nearly circular opening in the upper body section 2, by means of pivots 109, 110 in order to permit extended to-and-fro arm movements transverse to the body.

The diagonal split in the torso enables movable shoulders to be incorporated in the suit in which the upper shoulder pivot points are practically contiguous with the suit occupant's neck and yet enable the suit portions incasing head, both arms, and torso to be divided into a minimum of two sections, and the suit may be entered with a "crash" helmet on suit occupant's head. Normally the occupant's head especially with a helmet thereon is much broader than his neck, so his head therefore could not enter the suit if it had to pass through a narrow neck opening, however, the right shoulder ring 48, pivot pin 50, and the upper part of lower body section 3 fit under the dome 8 opening as shown in Fig. 7. The distance from left shoulder pivot pin 109 in Fig. 10 to the right side of the dome 8 as shown in Fig. 7 is enough to permit entry of the occupant's head and helmet 10 into the dome 8, where the distance from pivot pin 109 of Fig. 10 to pivot pin 50 of Fig. 7 is insufficient for head entry.

Pivot 109 is located as close to the occupant's neck as possible in order to duplicate the human body's natural shoulder movement. Shoulder section 108 is flexibly connected to upper body section 2 by means of a flexible fluid-tight material 111. This material 111 is billowed or ballooned in its fore and aft portions to permit a large degree of movement of the shoulder section 108 with respect to upper body section 2. In order to permit substantially normal rotary or torsional movement of the arm section at the shoulder, the outer race 112 of an anti-friction thrust bearing 113 is mounted on and bonded to the shoulder section 108. The inner race 114 of this bearing has a pair of ears or foreshortened arms 115 spaced on each side in a manner hereinabove explained with reference to right arm section 4. The arm at the shoulder rotates on bearing 113 and pivots on pins 116 about arms 115 by means of a pair of arms 117 which are made integral to and join inner race 119 of anti-friction thrust bearing 118 at diametrically opposed positions. The outer race 120 of bearing 118 is bonded to a somewhat elbow-shaped rigid tubular member 121 which forms part of the elbow joint. This arrangement permits rotation or twisting of the elbow section relative to the upper arm and shoulder sections. Connected to arms 117 at diametrically opposed positions by means of pivot pins 125 is the inner race 123 of a radial anti-friction bearing 122. The outer race 124 is bonded to tubular covering 126 similar in construction to tubular covering 73 heretofore described. Also integral with or fixedly attached to arms 117 at diametrically opposed positions is the inner race 128 of anti-friction bearing 127. The outer race 129 is flanged on one end and bonded to the race 129 is tubular covering 126. Tubular covering 126 is also bonded to shoulder section 108 with a suitable adhesive.

In axial alignment with flanged bearing race 129 is a plurality of polished thin metal, for example, stainless steel rings 130. Tubular covering 133 is circumferentially attached or bonded by a suitable adhesive at the innermost edges; for example, at point 131 to bearing race 129, rings 130, and flange 132. Tubular covering 133 is ballooned or billowed outwardly as described in connection with tubular covering 73.

Previously flying pressure suit rotary seals consisted of an amplification of just a plain annular thrust bearing with a felt or rubber ring bonded to the outer race and pressing gently against the inner race. This construction precipitated stiff turning under pressure, leaking outwardly under low pressure, entering of fluids if pressure differential was greater on outside, and rapid wearing of sealing material necessitating frequent replacement with usage.

Our invention precludes the possibility of such difficulties as mentioned above. Our rotary seal consists of as heretofore described bearings 118, 127, arms 117, rings 130, flange 132, and tubular covering 133. Our above rotary seal will allow twisting or rotation of the elbow section relative to the upper arm section. Seal located below the elbow and hereinafter described allows twisting or rotation of the forearm section relative to the elbow section. Our rotary seal is fluid-tight by virtue of the tubular covering 133, the covering 133 permitting rotation of the seal due to the shearing or moving of one circumferentially extending thread with respect to the mutually adjacent circumferentially extending threads of covering 133.

Resistance to turning our rotary seal comes from three sources. First is the friction of the anti-friction bearings which is negligible. Second is the friction of the cloth against the discs or rings which is small. Third is the effort expended in decreasing the trapped air volume which is directly proportional to the pressure differential between the inside and outside of suit, to the amount of rotation of the seal, and to the ratio of the distance between the center axis of the seal and the point 131 to the distance between point 131 and the periphery of the seal, and is inversely proportional to the number of billowed or ballooned sections of tubular covering 133. The distance between adjacent rings 130 also affects the effort, but since the distance should be always small it is neglected in the above analysis. By proper choice of seal configuration, the turning effort should be of little magnitude.

Pivotally mounted on upper elbow 121 on pins 134 is lower elbow section 135 having a flange 136 integral therewith. Circumferentially connecting elbow sections 121 and 135 is tubular bladder 137 of flexible fluid-tight material; for example, rubber impregnated woven fabric. This joint is virtually effortless to bend.

In axial alignment with flange 136 of elbow section 135 is a plurality of polished thin metal rings 138. Flange 140 is part of flanged frusto-conical member 144 which forms part of the forearm. A pair of arms 145 may be attached to lower elbow section 135 by means of rivets 146. Arms 145 are rigidly attached to or made integral with inner race 143 of anti-friction thrust bearing 141. Outer race 142 of bearing 141 is bonded to the inner edge of flange 140 of member 144. Attached and bonded to flange 136 and 140, and to rings 138 at, for example, point 147 is tubular covering 139 ballooned or billowed outwardly as described in connection with tubular covering 133.

The glove 148 is bonded with a suitable adhesive to the forearm member 144. The glove dorsal and wrist liner 149 is suspended from the forearm member 144 by fiber members 151 composed of nylon cord, for example, the fiber members 151 which prevent the liner from being pushed into the glove fingers by the occupant's hand. This liner 149 is adapted to fit snugly about the wrist of the suit occupant. A bleeder line 150 connects the interior of glove liner 149 with pressure regulating devices later to be described.

Figures 37, 38:
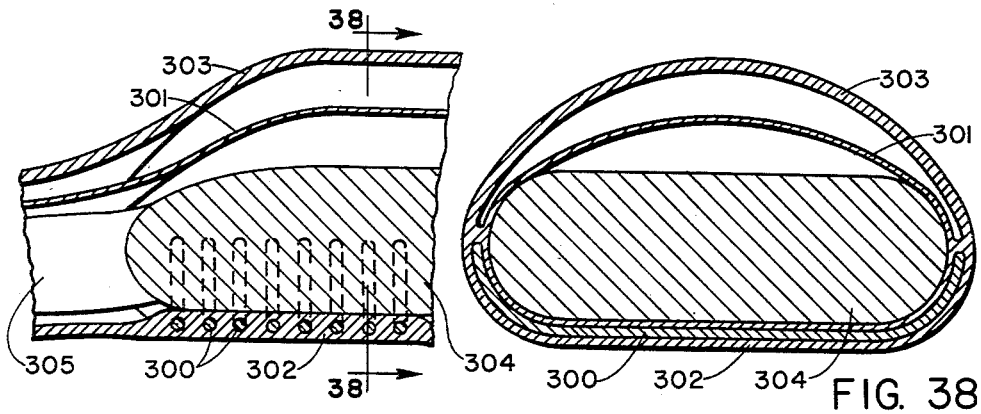
Fig. 37 is a fragmentary sectional view of an alternate glove construction showing the glove at the palm similar to Fig. 11.
Fig. 38 is a sectional view on the line 38—38 of Fig. 37.

Figs. 11 through 19 inclusive and Figs. 37, 38 in conjunction with Figs. 7 and 10 explain means that may be used for providing a close fitting glove on the palm side of the hand or a method of providing "feel" in the glove. In these figures, 152 represents the occupant's hand and 153 represents his middle finger. Dorsal finger portions 159 of dorsal liner 86, 149 are attached to finger portion 158 of glove 85, 148 along the sides and front of the fingers. 161 represents the space between dorsal liner finger portion 159 and glove finger portion 158. 162 represents the space between the liner portion 159 and palmar finger portions 157 of glove 85, 148 wherein the middle finger 153 is contained. Similarly 161 also represents the space between the dorsal liner 86, 149 and dorsal glove portion 155. Also 162 represents the space between dorsal liner 86 and the palmar glove portion 156 wherein hand 152 is contained. When there is no pressure in the suit, the parts above described will appear as in Figs. 13 and 16 and for type of glove 85 somewhat as in Fig. 11. When suit is pressurized, but glove pressure regulating devices are either inoperative or during the shut off portion of their operating cycles, the parts will appear as in Figs. 14 and 16 and for type of glove 85 as in Fig. 11. With less pressure within the liner space 162 than in space 161 by virtue perhaps of the glove pressure regulating devices, the parts will appear as in Figs. 15 and 17 and for type of glove 85 as in Fig. 12. This action as hereinabove described is duplicated for the thumb and other fingers of the hand.

One pressure regulating device for providing feel in the hand such as shown in Figs. 11 and 12 as a sectional view and also in Fig. 7 consists of a valve block 163 which is suitably bonded to the dorsal portion 155 of glove 85. Valves 164 and 165 are fixedly interconnected by a rod or other rigid member 166 so that when one valve is open the other is closed. Valve 165 when open permits fluid to flow from space 162 through flexible tube 172, around rigid member 166, and past valve 165 to the ambient atmosphere.

In Fig. 12 as occupant's finger 153 is bent, wire 174 attached to finger portion 158 at 175 pulls valves 165 open and closes valve 164, permitting fluid in space 162 to exhaust from the confines of the suit due to the fact that the occupant's finger forms a quasi-arc of a smaller diameter circle than wire 174 does, thereby relatively foreshortening the length of wire 174 which in turn opens valve 165. Wire 174 operates against the tension of spring 176 and is carried along the dorsal glove portion 155 and glove finger portion 158 in a series of identical guide blocks 177 with blocks suitably bonded to glove portions 155, 158. Wire 174 and blocks 177 may similarly be arranged on the thumb or other fingers, the wrist, or any other suitable articulated portion of the flying pressurized suit. In the middle finger 153 bent position the liner 86 presses tightly against the dorsal portions of occupant's hand, causing the glove portions 156, 157 to rest snugly against the occupant's hand, so that when the suit occupant touches something with the palmar part of his hand only the glove portions 156, 157 separate the hand from cuticular contact rather than a space 162 of fluid in addition.

When the occupant's finger 153 is unbent, valve spring 176 closes valve 165 permitting fluid to flow from space 161 through respectively port 171, past valve 164, and through tube 172 into space 162 and relieving all pressure on the hand other than internal suit pressure, which the rest of the occupant's body is also subjected to.

A modified means of providing feel in the hand is shown in Fig. 10 as a partial broken away sectional view. The glove 148 is constructed similar to glove 85 with these changes; the valving device 163 and wire 174 on the back of the glove is eliminated. Port 171 is sealed, tube 172 may become bleed line 150 of glove 148 leading up the arm instead of to the ambient fluid. Liner 86 becomes liner 149. Fluid from space similar to 162 is bled through bleed line 150 which leads to a pressure regulating device; for example 191 of Fig. 19, which is hereinafter described. This causes relative pressure against back of hand and provides feel as hereinabove explained. However, this is a constant pressure and cannot be regulated by middle finger movement as in glove 85. Therefore the pressure should be much nearer the internal suit pressure than was necessary in glove 85.

A modified pressure regulating device 179 for providing feel in the hand is shown in Fig. 18. It actually is a combination of the pressure regulating methods as shown in glove 85 and glove 148. The device 179 permits activation of feel in glove by finger bending, but instead of exhausting gases from space 162 into ambient fluid, the exhausted gases are bled through a bleed line 190, line 190 corresponding to line 150 of Fig. 10, to a pressure regulating device; for example, Fig. 19, to be hereinafter described. Also the modified pressure regulating device 179 may be, by option of suit occupant, locked in such a position that the glove has identical characteristics of operation as glove 148. Also by adjustment of pressure regulating device; for example, Fig. 19, in conjunction with modified pressure regulating device 179, the glove may demonstrate similar characteristics of operation as glove 85. This modified pressure regulating device 179 in construction is nearly identical with device on glove 85.

Device 179 consists of valve block 180 which is suitably bonded to dorsal portion 181 of glove similar to glove 85, or 148. Valves 182 and 183 are fixedly interconnected by a rod 184 so that when one valve is open the other is closed. When open, valve 183 permits fluid to flow from space 162 through tube 187, past valve 183, and then through tube or bleed line 190 to pressure regulating device; for example, Fig. 19.

Wire 193 corresponds to wire 174 of Figs. 11, 12, 16, 17 as heretofore described, and all appurtenances outboard of valve block 180 are similarly the same. When tension in wire 193 is released as hereinabove described, spring 194 closes valve 183 permitting fluid to flow from space 161 through respectively port 192, past valve 182, and tube 187 into space 162 and relieving all pressure on hand as hereinabove explained with relation to glove 85. Should the suit occupant desire the glove to operate in the manner of glove 148, he would first pull wire 193 by means hereinabove explained until valve 183 is in open position and valve 182 is closed. He then may push latch 195 to position shown in phantom line view and latch 195 rests against stop 196 also shown in phantom line view. This maintains valve 183 in open position until unlatched, thus permitting glove to act in manner of glove 148, no matter what position finger 153 assumes. Glove portion 198 corresponds to dorsal liner 86, 149 of Figs. 11, 12, 13, 14, 15.

Then equivalent to bleed line 150 of glove 148 is bleed passage starting at 197 of glove portion 198 and going through modified pressure regulating device 179 before going up the sleeve of the suit to a pressure regulating device; for example, Fig. 19. Latch member 195 is pivoted on ears 199 by pin 200 and suspended on valve block 180 by said ears 199. Both latch 195 and stop 196 are shown in full and broken line positions. Fluid is prevented from leaking between space containing spring 194 and ambient fluid by means of a friction seal 201 of neoprene, for example which surrounds wire 193 and is secured in valve block 180.

Fig. 19 shows a pressure regulating device 191 which may be used in conjunction with glove 148 or a glove using modified pressure regulating device as shown in Fig. 18. Line or tube 202 may be the other end of tubes or bleed lines 150 and 190. Fluid is maintained in tube 202 at equal or less than the static pressure of the fluid flowing from 203 toward 204 in the tube 205. The regulation of the pressure in tube 202 is controlled by the emergence of nose 206 of tubular member 207 into venturi portion 208 of tube 205. Tubular member 207 is held movably by bracket 209 and ball 210 of adjusting screw device 211. Regulation of pressure may be physically controlled by turning knob 212 of adjusting screw device 211. This pressure regulating device may be located in any supply or exhaust line or tube that maintains a fairly constant movement of fluid through the line; for example, a suit ventilating fluid exhaust line (not shown).

Figure 21:
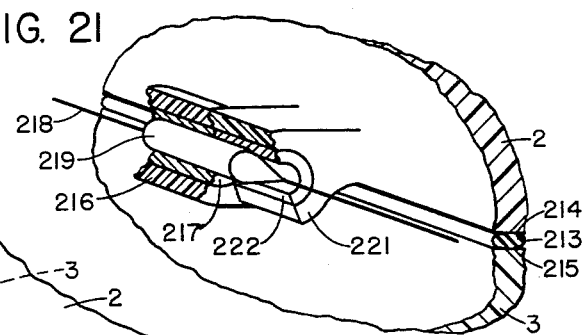
Fig. 21 is a similar view to Fig. 20, but with the sections engaged and in a fluid-tight sealed condition.

Figs. 20 through 23 inclusive show means whereby tubular and quasi-tubular sections may be releasably locked one to the other and also provide a fluid tight seal between contiguous inner portions and contiguous outer portions. An example of the above is the releasable locking of the upper body section 2 to the lower body section 3 as shown in Figs. 20 through 23 inclusive. An elastomeric ring 213 is bonded by a suitable adhesive to one body section, preferably upper body section 2 on rim 214 and is adapted to form a fluid-tight seal when engaged with rim 215 of lower body section 3 as shown in Fig. 21. A series of rigid ears 216 are mounted near outer upper edge of lower body section 3 intermittently all around the same and each rigid ear 216 has a tubular metal insert 217 therein and suitably bonded in order to prevent abrasion of the ears 216. A wire or cable 218 extends through each of the ears 216 and has at suitable points thereon, preferably partly within the ears 216, cylindrical locking members 219 with a taper at one end 220 of each for a purpose hereinafter described. These members 219 may be swaged on cable 218.

Mounted on upper body section 2 near its outer lower edge is another series of ears 221 adapted to be located, in normal use, adjacent to a corresponding ear 216 with ear 216 and ear 221 being in the respective juxtaposition as the cylindrical locking member 219 and its tapered end 220. Each ear 221 has a tubular metal insert 222, and there is a radially tapered gap 223 extending through the wall of ear 21 and insert 222 and adapted to pass over cable 218. When body sections 2 and 3 are properly juxtaposed, ring 213 will rest on rim 215 of lower body section 3. If now the cable 218 be drawn to the right, for example, as in Fig. 21, cylindrical locking members 219 will be drawn into the center of ears 221, this action being facilitated by the tapered ends 220. The openings in ears 221 are so placed that pulling locking member 219 into ears 221 causes ring 213 to be compressed thereby sealing the joint between body sections 2 and 3.

Figure 22:
Fig. 22 is a fragmentary top view of the locking arm arrangement, with the open or released position shown in phantom lines.
Figure 23:
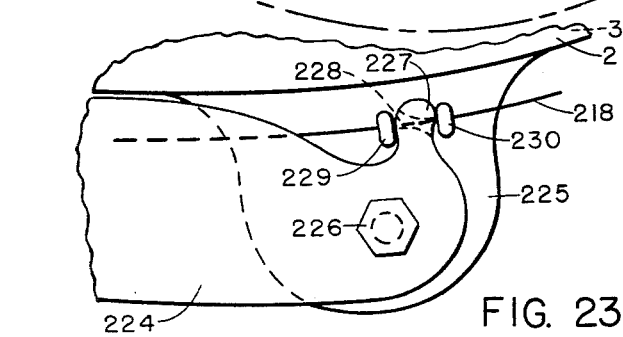
Fig. 23 is a fragmentary top view showing the connections between the locking arm and the draw wire.
Figures 27, 28, 29:
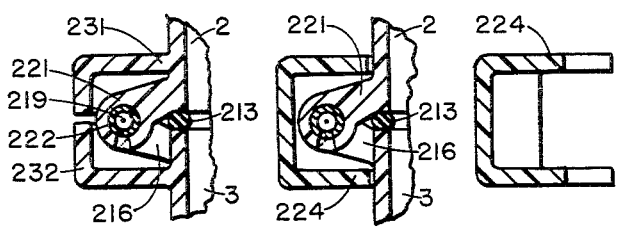
Fig. 27 is a sectional view on the line 27—27 of Fig. 22, looking in the direction of the arrows.
Fig. 28 is a sectional view on the line 28—28 of Fig. 22.
Fig. 29 is a sectional view on the line 29—29 of Fig. 22.

To operate the locking members 219, a cranked lever 224 is pivoted on an ear 225 mounted on lower body section 3 by means of a pin 226. A lever end 227 has a flared opening 228 therethrough, through which passes cable 218. A pair of stop lugs 229 and 230 suitably mounted, for example, swaged, on cable 218 and on either side of lever end 227 provide the means whereby lever 224 can cause locking and unlocking movement of the locking members 219. Fig. 22 shows in full lines the lever 224 in the suit locked position, the position of the lever in its released position being shown in phantom line. Lever 224 is channel-shaped as shown in Figs. 28 and 29 and forms a protective cover for portions of locking means hereinabove explained. The outer lower edge of upper body section 2 is provided with a half channel 231, and the outer upper edge of lower body section 3 is provided with a half channel 232 as shown in Fig. 27. These half channels 231 and 232 extend around the body sections 2 and 3 respectively from either end of cranked lever 224 to form a protective cover for the locking means hereinabove explained. The lever locking arrangement just described provides an easily operated positive means to join or separate members, for example, body sections 2 and 3, of a device which the complete periphery cannot be easily accessible for manual locking. The occupant locking or unlocking action when grasping the outboard end of lever 224 is just one uniform motion.

In Figs. 24 and 25 are shown how the leg sections may be joined to the body section by means of a hip joint constructions now to be described. At the lower end of lower body section 3, there is an opening 233 having a rim 235. Near rim 235 are two hip pivot holes 238 adapted to receive hip pivot pins 239. The U-shaped movable member 240 with upper edge 241 is mounted in the opening 233 on pins 239 by means of pivot holes 243. Hip member 244 is also mounted, by means of holes 245 and moves within U-shaped member 240. Hip pivot pins 239 are suitably bonded in holes 245. Upper rim 246, leg edge 248, crotch section 250, and grooves 251 and 252 of crotch section 250 designate hip member 244 in detail.

Right leg ring 253 is mounted on hip member 244 by means of a pivot pin 254 passing through holes 255 and 256, and by means of rollers 257 riding in groove 251 of crotch section 250. Similarly the left leg ring 270 is mounted with rollers 271 riding in groove 252. This connection permits to and fro movement of the leg member with respect to the hips of the occupant. Pivot pin 254 is bonded suitably in hole 256. Sideways or transverse pivoting of the leg member is provided by the movement of right upper leg member 258 on pin 259 passing through hole 260 and passing into hole 263 and is suitably bonded in hole 263. Similarly pin 262 passes through hole 261 and passes into hole 264 and is suitably bonded therein. The right lower leg member 265 is pivoted to the right upper leg member 258 by knee pivot pins 266 passing through holes 268 abandoned and bonded in holes 267.

Joint construction between right lower leg member 265 and right upper leg member 258 is exactly the same except in dimension as the joint construction between lower elbow section 135 and upper elbow member 121 of left arm section 5. The knee joint has a tubular ring (not shown) of flexible fluid-tight material very similar to tubular ring 137 of left arm section 5. On the lower extremities of right lower leg member 265 may be suitably bonded an aviator's flying boot (not shown) or other suitable lower leg and foot covering that is fluid tight. The flexing of the flying boot may be the sole means of twisting the leg in the flying pressurized suit and will thereby provide sufficient torsional movement for all normal aviator leg functioning, however, if necessary, a rotary seal may be interposed therein. The left leg is of approximately similar construction as the right leg.

Figure 26:
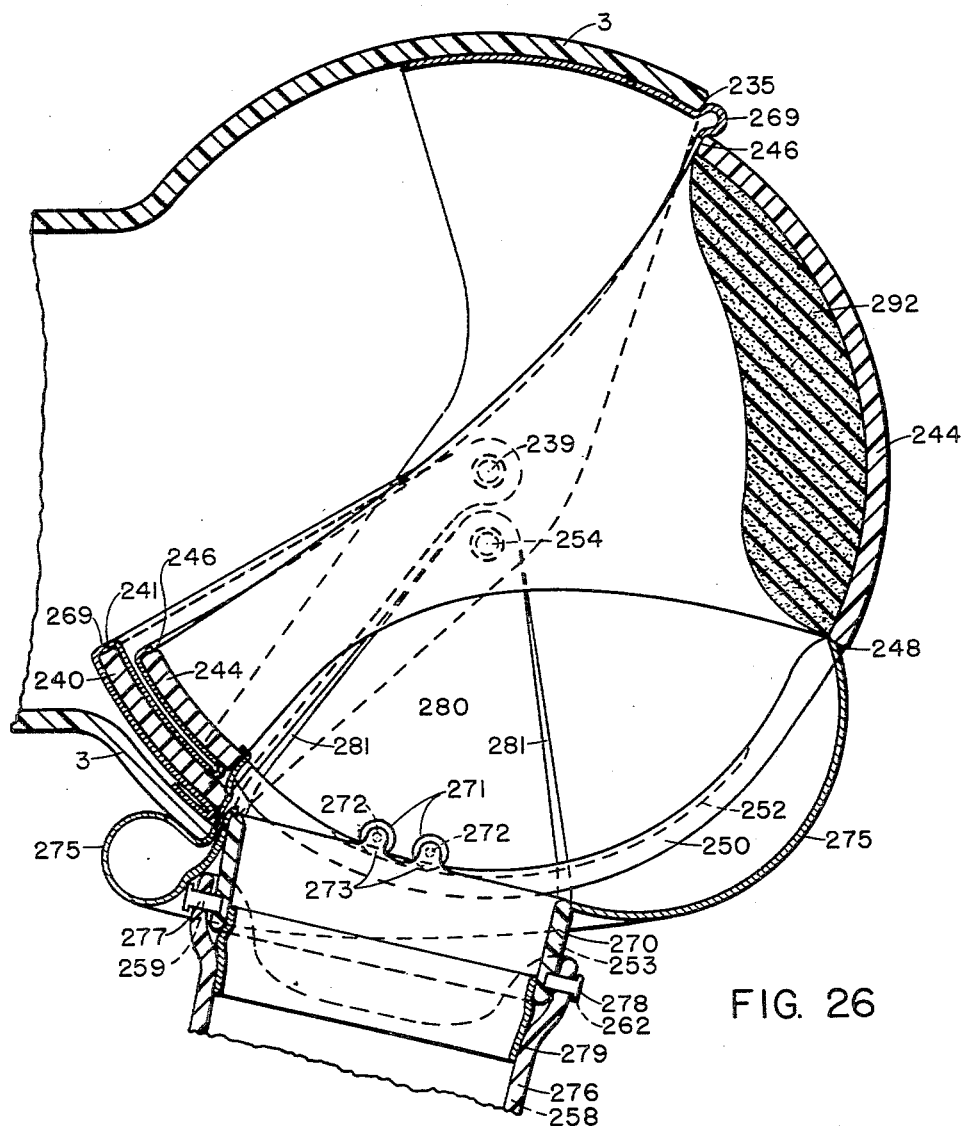
Fig. 26 is a sectional view on the line 26—26 of Fig. 1, looking in the direction of the arrows, and with the body in a leaning over position.

In Figs. 24 and 25 the flexible fluid-tight interconnecting material is not shown for reasons of clarity, however, Figs. 10, 26, and 30 show the flexible fluid-tight interconnecting material in detail.

In Fig. 26 is shown a portion of the suit 1 with the occupant in a standing or stooped position bending forward from the waist or hips. Fig. 26 is a sectional view through the center of the left leg and the corresponding body portion. The right leg is immediately beside the left leg in the same fore and aft position, therefore the right leg is completely obscured in the view shown except for portions of the right leg ring 253.

Occupant's torso (not shown) and lower body section 3 are both in a horizontal position. U-shaped movable member 240 has moved in a clockwise direction around pins 239 until its upper edge 241 is almost touching occupant's stomach (not shown). Hip member 244 has also moved in a clockwise direction about pins 239 until the front of upper rim 246 is also almost touching occupant's stomach (not shown). In both Figs. 26 and 30 and with occasional reference to Fig. 10 is shown the hip joint fluid-tight flexible sealing means. Hip member 244 is flexibly connected, with U-shaped movable member 240 interjected in the front portion, to lower body section 3 by means of a flexible fluid-tight material 269; for example, rubber impregnated woven fabric. The material 269 is suitably bonded where necessary to hip member 244, U-shaped moveable member 240, and lower body section 3. The material 269 is billowed or ballooned where necessary and is formed to approximately follow the contour of the rigid suit members heretofore described.

In Fig. 26 the left leg ring 270 is mounted in groove 252 of crotch section 250 by means of rollers 271 pivoting on pins 272 in ears 273 projecting from left leg ring 270. The left leg ring is mounted on a pivot pin 254, in Fig. 10, corresponding to pivot pin 254 of the right leg ring 253. In Fig. 26 the leg rings, 253 and 270 have moved in a clockwise direction on rollers 271 and 257 and around pins 254 until they are adjacent to the front of rim 235 of lower body section 3. Leg rings 253 and 270 are both flexibly connected to hip member 244 by means of a flexible fluid-tight material 275 which is suitably bonded to corresponding adjacent members except in the crotch of the suit and there the material 275 is bonded directly from right leg ring 253 to the left leg ring 270 (shown as a downward projecting bulge at the crotch of Fig. 1). The material 275 is appropriately billowed or ballooned to allow free flexible movement of legs.

In Fig. 26 the left upper leg member 276 pivots on left leg ring 270 by means of pivot pins 277 and 278 which respectively correspond to pivot pins 259 and 262 of right leg ring 253. Left upper leg member 276 is flexibly connected to left leg ring 270 by a flexible fluid-tight material 279 which is suitably bonded and billowed or ballooned. The corresponding right leg portions are flexibly connected in a like manner. In both Figs. 26 and 30 are shown portions of the right leg ring 253 by virtue of the arbitrary method of sectioning utilized. As seen by looking through left hip cavity into right hip cavity is the upward projection 280 of right leg ring 253 and the right leg upward projection edge 281 is also shown in Figs. 26 and 30. Left leg below the left upper leg member 276 is similar to right leg section 6.

Fig. 30 shows a portion of the suit 1 with the occupant in a standing erect position with legs tilted slightly backward. Fig. 30 is a sectional view through the left leg as in the manner of Fig. 26, heretofore described. In Fig. 30 the U-shaped moveable member 240 and hip member 244 have both rotated counterclockwise about pins 239 until flexible material 269 has rolled away from one surface and rolled onto the opposite adjacent surface as in the neck joint which has been heretofore described. The hip movement is made greater by the utilization of U-shaped member 240 aand could be made correspondingly greater by the addition of similar members and by the removal of a strip of lower body section 3 adjacent the front edge of rim 235.

The objective in having the large bulges of flexible material 275 is to allow large movements of the legs differentially; for example, left leg all the way forward, right leg all the way to the rear. This large differential movement is needed; for example, when the occupant is on the ground and must climb into or out of an airplane with just breathing and ventilating pressures within the suit.

A pad or cushion 292 of sponge rubber or the like is placed at the posterior portion of hip member 244. The rigid members as shown in Figs. 24 and 25 may be composed of a suitable rigid material; for example, resin impregnated fiberglass.

To further functionally amplify the flying pressurized suit as shown in Figs. 1 through 30 inclusive and as described hereinabove, we will particularize some activities of the suit occupant and the subsequent manipulation and utilization of the suit in relation thereto. A description of the dome functioning has heretofore been related. The suit occupant, after donning accessory clothing (not shown) and crash helmet 10, enters the flying pressurized suit lower half, which may include lower body section 3, right arm section 4, and left and right leg sections 6 and 7. The suit lower half for ease in entering may be placed horizontally and facing upwards on the floor or may be placed on an inclined plain (not shown) with the leg portions of the suit 1 pointing towards the bottom of the incline and again with the suit in a facing upwards position. The suit occupant may then from a sitting position, with his legs extended in front of himself, push himself feet first into the leg portions of the suit and may also grasp the suit in order to pull himself fully into the suit leg portions.

At this time the occupant's legs are fully in the suit and he has made no endeavor to place his right arm inside the right arm section 4 of the suit 1, and subsequently his body is in a slight bend at the waist toward his left side to prevent his right arm from abutting against the right side of lower body section 3. The suit occupant then, with both hands and arms available for assisting himself from a prone or sitting position, gains an erect attitude. This body is still bent to the left at the waist and he increases the amount of bend, which the cutaway portion on the left of the torso on lower body section 3 readily permits, and thrusts his right arm into section 4 of the suit 1, and straightens his body to an erect position while dropping his shoulder slightly to slip under and past the suit shoulder at pivot pin 50 of shoulder section 48 of lower body section 3. At this time the suit occupant may connect up whatever ventilating lines, breathing line, or other devices (all not shown) which may pertain to the lower half of the suit.

The suit occupant then grasps the suit upper half which may consist of upper body section 2, left arm 5 and dome 8. Holding the suit upper half aloft, the occupant thrusts his left arm about half way into left arm section 5 and cocking his head to the left, he slowly moves his left arm up the left arm section 5 and simultaneously his head with helmet 10 thereon into dome 8 until shoulder 13 of helmet 10 rests against inner bearing race 14 of dome section 8. The suit occupant juxtaposes lower body section 3 and upper body section 2, and then presses against outboard end of cranked lever 224 so that lever 224 is flush against suit, thereby locking the suit halves together. At this time the suit occupant may connect up whatever ventilating lines, breathing lines, survival gear, parachute straps, or other devices (all not shown) which may pertain to the suit 1.

Since the suit intact is omni-environmental as hereinafter explained, there should be no need to doff the suit should the suit and occupant enter the water. However, if due to military action or other actions, the flying pressurized suit should leak inwardly and fill the suit cavity with water, the occupant would release the cranked lever 224 and kick off or wiggle out of the suit lower half, which by keeping his left arm at his side the suit upper half would not ride up over his head due to the trapped air in the dome giving the suit upper half buoyancy for instead the suit upper half would grip him under the left arm pit. After the suit lower half was discarded, he then could remove the suit upper half at his own discretion. The split in the torso as hereinbefore described therefore provides a valuable safety feature in that the occupant may make unassisted escape therefrom.

For ventilation and breathing in the suit unpressurized, should the supply lines become disconnected or inoperative, an auxiliary large-volume low-pressure hand pump (not shown) may be used to supply the necessary air. For normal doffing of the suit, the steps taken would be reverse for donning it.

Our flying pressurized suit as heretofore described is constructed where possible of materials that will not stretch to any great extent under internal suit pressure. Therefore, if the suit fits the suit occupant unpressurized, it will similarly fit pressurized, whereas, a suit of all cloth construction is known to stretch considerably when pressurized distending the dome or helmet of the suit upwards to where it is hampering occupant vision. An additional cause of this dome distension when pressurized in an all cloth suit are the hips when suit occupant is seated, for the occupant does not have a firm suit or hip base to sit on and the cloth hip portions tend to slide around the hip's posterior portions in an upwards direction. Also cloth suits tend to distend from the extremity of the body's limbs under pressure as heretofore explained, and in general the centerlines of cloth suits do not roughly duplicate the human bone structure of said limbs, which in turn causes a continual extending and retracting of glove fingers with relation to fingers of occupant's hand during continuous flexing of elbow, for example. This extending and retracting is imposed upon the distending due to natural cloth stretching. Our suit by virtue of its rigid frame work which attempts to externally duplicate the human bone structure greatly lessens the possibility of such distending difficulties. Also our suit when made of rigid material construction afford a certain degree of protection from exploding artillery or anti-aircraft shell fragments, and if rupture of the suit wall from such should occur, it may be feasible to seal it rapidly by virtue of the suit wall being punctured and not torn as with cloth.

The type glove such as shown in Fig. 11 permits a selective feel nearly duplicating a finger without gloves. For example, an aviator wishes to flip or push a concealed or protected toggle switch on an instrument console in an airplane. Such toggle switch is one that has metal guards on each side parallel to the direction of toggle throw. These guards are meant to prevent inadvertent hitting of the switch, and to assure this, the guards render the toggle switch very inaccessible except to deliberate attempts. Therefore a glove finger as in Fig. 16 would not fit into the toggle switch slot, but when the suit occupant bends his middle finger of glove 85 and leaving his index finger in a straightened position, the index finger will assume a shape similar to Fig. 17. The suit occupant may then fit his finger into the toggle slot and push the toggle switch, and he immediately thereafter straightens his middle finger, thereby, relieving the blood circulation stopping pressure on the hand.

The suit as shown in Figs. 1 through 30 inclusive may not include construction that will meet all tactical exigencies of a flying pressurized suit, therefore, some other construction may become necessary. Hereinbelow is described optional construction that may be integrated with a flying pressurized suit if deemed appropriate. Fig. 35 shows a view of an alternate construction for lower body section 3, said view being similar to view shown in Fig. 24. This alternate lower body section 283 corresponding to and replacing lower body section 3, is itself composed of two parts, lower body section upper half 284 which may have added thereon right arm section 4 and lower body section lower half 286 which may have added thereon right leg section 6, left leg section 7, U-shaped section 240, and hip section 244. Joining the two sections 284 and 286 may be a rotary seal 288 which permits rotation of the upper section 284 with respect to lower section 286. Fig. 36 shows a sectional view of rotary seal 288, said seal principles and construction being similar to rotary seals immediately above and below the elbow in left arm section 5.

In Fig. 36 rotary seal 288 comprises an anti-friction thrust bearing 289 of which bearing outer race 290 is suitably bonded to section 284 and bearing inner race 291 is suitably bonded to section 286. A combined flange and rotary seal cover 293 of section 284 matches combined flange and rotary seal cover 294 of section 286 at 295 and thereby forms a protective covering for rotary seal 288. A plurality of polished thin metal rings 296 extend around the periphery of body section 283 and comprise a part of rotary seal 288. In upper body section holes 285 and 287 have pins 106 passing therein and bonded thereto. 292 is an opening in upper body section 2 to which is joined left shoulder member 108, shoulder member 108 forming a joint of the same basic type as the left elbow joint. Bonded by a suitable adhesive to the innermost portion of the rings 269 at, for example, 297 and to the flanges 293 and 294 at 298 is a flexible fluid-tight material 299 comprised of, for example, rudder impregnated woven fabric which is billowed or ballooned outward between rings 296. The action of rotary seal 288 has heretofore been similarly described in regard to rotary seals on the left arm section 5.

When the suit occupant is in a sitting position and his shoulders are not restrained in any manner, a suit as shown in Fig. 35 will enable the suit occupant, through combined head turning and body twisting, to look directly behind with regard to the facing direction of his hips. A means of decreasing fore and aft bulging at the waist of alternate section 283 is to tilt the seal 288 downward in the front and correspondingly upwards in the back. Such procedure would decrease fore to aft distance at the waist, but alternate upper section 284 would tilt, for example, to the right if the suit occupant rotated his body and consequently alternate upper section 284 to the left. However, such body tilting is a natural body movement when unencumbered by a flying pressurized suit when looking directly behind, but in this situation, the qualifying factor is whether there is room in the airplane cockpit for such body tilting. This alternate construction is also fluid-tight and the seal 288 is easily rotatable as hereinabove explained with reference to the left arm section 5.

Figs. 37 and 38 show an alternate construction for the palm of a glove and may be adapted to any of the gloves hereinabove described. This construction is principally useful in the instance where a suit occupant in the pressurized condition must continue to grasp a cylindrical object in his hand for long intervals; for example, an airplane lateral and longitudinal control rod or joy stick. With the glove arrangement of Figs. 37 and 38, the suit occupant can maintain a sort of palm "feel" while grasping the aforementioned rod with glove "feel" devices deactivated.

In Figs. 37 and 38 a plurality of U-shaped metal rods 300 are buried in the material of palm portion 302. Parts 301, 302, 303, 304 and 305 correspond respectively to parts 86, 156, 155, 152 and 153 of Fig. 11. Fig. 38 roughly corresponds to Fig. 14 in which the suit is pressurized and the feel devices inoperative, but in Fig. 38 the plam of the hand 304 may rest against the glove palm portion 302, thereby enabling the suit occupant to grasp an object instead of the bulged glove palm as in Fig. 14 pushing the object away. The palm configuration as shown in Figs. 37 and 38 also prevents squeezing of the sides of the palm of the hand in a pressurized condition. Such squeezing is tolerable to the occupant at low flying pressurized suit pressures, but with the advent of higher suit pressures such squeezing is quite noticeable to the suit occupant.

Figures 39, 40:
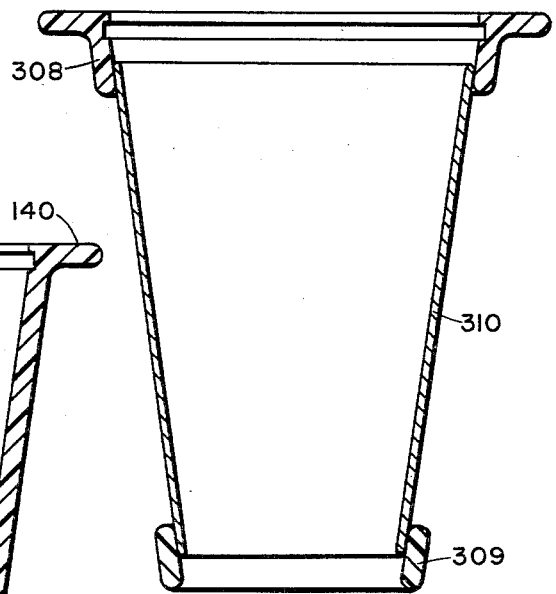
Fig. 39 is a sectional view of rigid forearm member of left arm.
Fig. 40 is a sectional view of forearm member similar to Fig. 39, showing an alternate construction.

In some instances it may seen advantageous to make the flying pressurized suit mostly of cloth or flexible material, yet retain the advantages and features of the rigid type suit joints as hereinabove explained, or it might be desirous to substitute some of the type joints hereinabove explained for the present joints of the cloth or flexible type suits. Fig. 39 is a sectional view of rigid forearm member 144 from left arm section 5. If optional partial cloth construction were chosen for forearm member 144, member 144 may appear as in Fig. 40.

In all other views of this specification a similar optional cloth method of constructing sections of the suit with reference to Figs. 39, 40 may be made of rigid portions of the suit, which should be self-explanatory to one skilled in the art after perusal of the hereinabove and below explanation. A ring of rigid material 308 is bonded by a suitable adhesive to a truncated cone or tube of flexible material 310 and in turn is bonded by a suitable adhesive to ring of rigid material 309. And similarly in other views of this specification where a rigid surface terminates, the edge of the surface may be kept rigid and the material between said surface and other edges of the surface may be made flexible by a transitioning of the material, for example, woven fiberglas cloth, impregnated with polyester resin at the edges thereof and impregnated with rubber therebetween or the edge of the surface may be kept rigid as in Fig. 40.

An alternate or optional leg arrangement is shown in Fig. 41. Alternate hip member 311 is the same as hip member 244 of lower body section 3, except that holes 256 and grooves 251 and 252 have been removed. Hanging from and attached to crotch piece 312 are two wires 313 and (not shown) to guide the inside of right leg section 315 and left leg section 316 respectively. Hanging from and attached to right side of hip member 311 is a wire (not shown) which travels down the outside of right leg 315 and from the left side of hip member 311 hangs and is attached a wire 318 which travels down the outside of left leg 316. Between each leg's wires is suspended a tubular section 319 and 320 respectively of flexible fluid-tight material; for example, rubber impregnated woven fabric.

These sections 319 and 320 are guided and maintained therebetween by wires 313, and 318 by means of flexible tapes 321, and 324 respectively resting over said wires and bonded by a suitable adhesive or sewn to tubular sections 319 and 320. The tubular sections 319 and 320 are of pleated or overlapped construction in the region of the knees 322, 323 and at the hip 314, 317. The wires 313, and 318 terminate at their lower extremities in conventional fluid tight aviators boots 326 and 327 and are firmly attached thereto, by a suitable adhesive. The tubular sections 319 and 320 are bonded by a suitable adhesive at their extremities to alternate hip member 311 and to aviator's boots 326 and 327.

The pleated or overlapped construction at 322, 323, 314, 317 permits fore and aft movement of the occupant's legs at the hips and at the knees. The individual pleats move in relation to each other making the distance from the lower edge of a pleat to the lower edge of an adjacent pleat either greater or less at the front or back portion of the tubular sections 319, 320 in which a rearward movement of the occupant's lower leg may cause an increase in the distance between pleat edges at the front portion of 322 or 323 and a decrease at the rear of 322 or 323, the pleats sliding over adjacent pleats at the front and back portions of 322 or 323 during articulation of the occupant's leg, the wires as hereinabove mentioned restraining the foot portion from distending from the occupant's lower limb.

The alternate construction as shown in Fig. 41 has several advantages with respect to leg sections 5 and 6 of flying pressurized suit 1, and among the advantages is that the leg sections 315 and 316 twist comparatively easily, especially when unpressurized therefore eliminating leg rotary seals, and also the suit is very easy to don and doff, for the occupant rather than having to get down on the floor or an inclined plane may purchase on the edge of a chair, for example, grasp lower body section 3, thrust right leg into leg section 315, rest lower body section 3 on knee of left leg, take both hands and pull up and collapse in accordion like manner tubular section 319 until foot is in aviator's boot 326, then rest lower body section 3 on right knee, thrust left leg into leg section 316 until foot is in aviator's boot 327, then with one hand grasping lower body section 3, and the other hand pushing against chair seat, the occupant rises to a standing position, and the occupant pulls lower body section up to proper position on his body and the procedure for donning the suit then is as hereinabove explained. For doffing the suit, the donning procedure is reversed. Another advantage is that the legs 315, 316 will collapse when unpressurized in the water permitting the occupant to float in a position other than prone or supine, which affords a safety feature for long periods of immersion or rough seas.

Prior to the advent if a successful flying pressurized suit, a fairly universal means of providing human acclimatization to rarefied air was to provide a fluid-tight airplane cockpit or cabin inclosure and pressurize the cockpit to simulate a lower altitude. Then in military aircraft where the possibility of failure of said fluid-tightness was ever tactically apparent, a so-called partial-pressure suit (not shown) was devised to afford protection in the event the primary protection of a pressurized cockpit should fail, the partial-pressure suit becoming operative only upon primary failure. The partial-pressure suit functions by tightening flexible material by various means against all parts of the body except the head and neck. This tightening of material simulates the effect of air pressure against the skin, but the inability of the material to follow body and limb contours exactly, soon when in operation hampers blood circulation by uneven pressures against the skin. At the face and neck the partial-pressure suit has pressurized air trapped in a fluid-tight helmet and neckpiece, and thereby simulates a lower altitude corresponding to the tightened material on the rest of the body. The pressurized cockpit offers primary protection and the partial-pressure suit offers secondary protection to the occupant from the hazards of rarefied air, such hazards having heretofore been explained.

Our flying pressurized suit is capable of containing an occupant who has donned such a partial-pressure suit, the only modification required other than breathing connections is incorporating into helmet 10 a fluid-tight transparent piece (not shown) over the front part of helmet 10 and then integrating both helmet 10 and transparent piece with a flexible fluid-tight neck piece (not shown) as in present operational partial-pressure suits. Such arrangement offers both primary and secondary protection in one compact unit, lessening the possibility of failure due to anti-aircraft shell explosions and the like, because of the suit being a smaller target than is the cockpit. Also such arrangement offers a great reduction in cost, weight, and thermal problems of a cockpit due to the non-pressurizing of the cockpit now made possible.

In addition our flying pressurized suit as shown in Fig. 1 has breathing and ventilating connections and hose (all not shown). Also the suit occupant may wear in addition to a partial-pressure suit, an anti-gravitational suit (not shown) and such other functional devices as may be necessary underneath our flying pressurized suit. Our flying pressurized suit is also omni-environmental as hereinafter explained with reference to the fourth modification of this invention.

A diving suit should possess desirably certain characteristics and be capable of performing certain functions as described more fully hereinafter for meeting the requirements of extended and safe service in the water at great depths and at the surface of same. Such service may be exemplified by an occupant's engaging of grappling hooks on portions of a submerged object; for example, a floundered sea going vessel. Heretofore diving suits have generally maintained the pressure within the suit approximately the same as the ambient water pressure. Our invention provides a means as hereinbelow shown of reducing the internal suit pressure in relation to ambient water pressure and still provide proper functioning of the suit. The degree of said reduced pressure depends upon the amount of activity required of the suit occupant; for example, if the occupant were just submerged to observe a sunken object and the occupant was not required to do any movement, the suit pressure could be considerably lower than ambient water pressure, and should the occupant be required to make extensive limb movements, the suit pressure should more nearly approximate ambient water pressure to facilitate movement of said limbs. Therefore the occupant could make several rapid exploratory dives to a sunken wreck, for example, with internal suit pressure near atmospheric, immediately resurface without a suit decompression interval, and then resubmerge with equipment necessary to undertake the assigned sub-surface task.

When resurfacing and after the suit occupant has been subjected to internal suit pressures considerably greater than atmospheric, the occupant must make a gradual ascent to prevent a manifestation of aero-embolism or "bends." This gradual ascent or decompressing requires the occupant to remain for long intervals in the water after performing his sub-surface task, and subsequently lessens the length of useful time a diver spends in the water, and if the suit is not properly insulated with regard to the ambient water temperature, the occupant will often undergo an enervating ordeal while slowly surfacing. Our invention precludes such enervation by enabling the suit to be pressurized above ambient water pressure while surfacing, that is, pre-inflating or post-inflating the suit, and the occupant, when surfaced with the suit at an internal pressure corresponding to a considerable depth in the water, is placed in a decompression chamber that has the same pressure as the internal suit pressure. The occupant then could doff the suit and undergo the remainder of his decompressing in the relative freedom of a decompression chamber, for example, he could write his work report on the just completed dive.

Immediately hereinbelow is a hypothetical example illustrating the use of the pre-inflation type of diving suit. For example, let X represent a certain number of atmospheres pressure, and let Y be the amount of time in minutes for the decompressing interval for X atmospheres of pressure, that is, if the suit occupant dove to a depth of 5X atmospheres, it would normally take him 5Y minutes to resurface without ill effect to his person. Herein used is the "gage" system of units, with 0 atmospheres considered the pressure at sea level. Our pre-inflation diving suit, for example, might have free swinging limb movement up to an internal pressure differential of 2X atmospheres less than ambient, and said suit might have limb movement at an internal pressure differential of X atmospheres above ambient pressure, that is, the suit is pre-inflated. Also for example, the suit may withstand a total internal pressure differential of 10X atmospheres before suit failure either above or below ambient pressure. With the above exemplification of the suit's characteristics, a diver descends to a depth of 10X atmospheres to observe a submerged object wearing our pre-inflation diving suit. Therefore, as hereinabove exemplified, the internal suit pressure may remain at atmospheric, and when the occupant has finished his observations, he may immediately ascend to the surface, eliminating the normal 10Y minutes interval associated with the decompressing ascent. The occupant may dive again to explore the object and perhaps collect parts of the object for removal to the surface.

To maintain free limb movement at 10X atmospheres depth, the suit has an internal pressure of 8X atmospheres, 2X atmospheres less than ambient. The resurfacing would be rapid with the suit internal pressure kept at 8X atmospheres, and from a depth of 8X atmospheres on upward the suit would be in a pre-inflation condition. The suit and the occupant would be immediately placed in a de-compression chamber where the occupant would doff the suit and spend 8Y minutes decompressing in said chamber, and the suit occupant would thereby save 10Y minutes decompressing time in the water, and save a total overall decompressing time of 2Y minutes. For example, a diver cannot withstand more than 30X atmospheres of pressure without harmful effects to his person, but with our pre-inflation diving suit a diver therefore could go to a depth of 40X atmospheres and spend only 20Y minutes in the water decompressing.

Our diving suit is useful in other ways, especially, militarily. Since the suit does not leak, the only escaping gases would be those of ventilation and breathing. Our diving suit could be disconnected from the hose lines to the surface and make use of a self-contained oxygen recirculating dehumidifier and carbon dioxide removal unit incorporated onto the suit, and then the suit occupant could dive, swim under the surface of the water, and leave no trail of bubbles rising to the surface. Such a suit would be very effective in entering a military antagonists marine installations undetected.

Our diving suit with certain exceptions is constructed similar to our flying pressurized suit as shown in Fig. 1. The hands and feet would be of a heavier construction, for example, a rigid material like the other rigid portions of the suit. Such a hand construction would prevent any bending of the hand and such construction being necessary to prevent the blood circulation from being impaired, when the ambient pressure is much greater than suit pressure. However, if the suit is always to be operated with the internal suit pressure about the same or greater than ambient, a glove similar to glove 85 with "feel" devices removed of right arm section 4 may be used. To effect ease of suit operation with suit internal pressure less than ambient, the flexible tubular members comprising flying pressure suit 1 must be modified.

Fig. 31 is a fragmentary sectional view of a pre-inflation diving suit rotary seal, the purpose for which has heretofore been explained with regard to the flying pressurized suit. The rotary seal of Fig. 31 is constructed exactly as the forearm rotary seal of left arm section 5, with two exceptions, anti-friction thrust bearing 141 is replaced by a two-way thrust bearing 328 and the tubular covering 139 is replaced by a tubular covering 329 which is bonded at 330. The seal comprises a plurality of polished thin metal rings 331, flange 332, flange 333, tubular member 334, and tubular member 335 which correspond respectively to parts 138, 136, 140, 135, and 144 of the forearm rotary seal of left arm section 5. Bearing 328 is constructed similarly to bearing 340 of Fig. 32 hereinafter described.

The pre-inflation diving suit type of rotary seal of Fig. 31 would be substituted for upper arm rotary seal and forearm rotary seal of left arm section 5, rotary seal 288 of alternate lower body section 283, and wherever rotary motion of any body part may be needed. Tubular member 329 is billowed or ballooned inward when internal suit pressure is less than ambient which is the normal operating condition as is shown by solid lines. Tubular member 329 billows or bulges outward in the pre-inflated condition as shown by phantom lines when the internal suit pressure is greater than ambient. Said seal is much more difficult to rotate while in the pre-inflated condition for an equal but opposite pressure differential as with regard to the normal operating condition as shown by the solid lines, because the polished metal rings do not inhibit the cloth sliding against the rings, for the same cloth sliding against itself may create greater frictional resistance.

Fig. 32 shows a typical fragmentary sectional view of an arm for our pre-inflation diving suit, an arm similar in construction and principles as right arm section 4 of our flying pressurized suit. In Fig. 32 anti-friction radial bearings 336, 337, 338 respectively correspond to bearings 78, 75 and 70 of right arm section 4. The pre-inflation diving suit radial bearings 336, 337 and 338 however have a larger diameter for identical occupant proportions for when the tubular covering 339, corresponding to tubular covering 73 of right arm section 4, bulges inward, it should not press against the suit occupant's arm. Two-way anti-friction thrust bearing 340 corresponds to bearing 59 of right arm section 4, however, race 341 rotates against race 342 when diving suit is in pre-inflated condition and race 343 rotates against race 341 when suit is in normal operating condition as exemplified by the ambient pressure greater than suit internal pressure. Race 342 is made integral with arms 344. Race 343 is fastened to arms 344 by means of diametrically opposed pins or bolts 345. Arms 350 are suitably bonded to or made integral with race 341. Pivot pins 346, 347, and 348 of Fig. 32 are similar and functionally correspond to pins 63, 74 and 69 of right arm section 4. Arms 349, 344, and 350 have similar functions and respectively correspond to arms 64, 62, and 58 of right arm section 4. Tubular covering 339 is shown in normal operating condition as a solid line and in the pre-inflated condition as a phantom line. The remainder of the diving suit right arm type construction (not shown) corresponds to right arm section 4 and is similar in construction to Fig. 32 as one skilled in the art would recognize. This right arm type diving suit construction is not effortless in movement and may not be recommended for diving suit use when much limb movement is required, especially with the suit withstanding a large pressure differential. However, a compensating device similar to the one shown in Fig. 8 may be adapted to be used with the pre-inflation diving suit arm, wherein the cable would be fastened to the bottom of diaphragm and then travel downward piercing the suit to enter into the suit at about the juncture of body section 3 and wall section 90. Such type diving suit arm construction would be used for an arm section corresponding to right arm section 4 of the flying pressurized suit and to left arm section 5 between the upper arm rotary seal and the left shoulder.

Fig. 33 shows a typical fragmentary sectional view of a spherical type of movable joint for a flying pressurized suit as characterised by the neck joint, shoulder joints, right elbow joint, hip joint, upper leg joints and knee joints of our flying pressurized suit 1. For comparative purposes, Fig. 34 shows an identical fragmentary sectional view of the same joint as Fig. 33 where Fig. 33 is typical of a flying pressurized suit construction and Fig. 34 is typical of a pre-inflation diving suit, and the type bladder or tubular section 352 as shown in Fig. 34 should be substituted where applicable for tubular section 351 as shown in Fig. 33.

The functions of the joint in Fig. 34 for a pre-inflation diving suit are the same as the joint construction of Fig. 33 as hereinabove explained. However, for normal diving operation, as the tubular section 352 is shown in solid section, the joint is nearly effortless to move, but in pre-inflated condition, the effort to move the joint increases with the degree of pivoting about the hinge with a neutral effort position maintained about half way between extreme joint movements. Hereinabove is stated the type joints and the specific joints that type joint of Fig. 33 is equivalent to and likewise which joint of Fig. 34 may be substituted in for a pre-inflation diving suit. For example, tubular sections 351 and 352 correspond to tubular section 137 of left arm section 5. Rigid members 353 and 354 correspond to each other and to elbow-shaped tubular section 121 of left arm section 5. Rigid members 355 and 356 correspond to each other and to lower elbow section 135 of left arm section 5.

The rigid sections of the pre-inflation diving suit may be constructed of resin-impregnated fiberglass, aluminum, steel, titanium, or other suitable materials. The fluid-tight flexible sections may be made of a rubber or plastic impregnated woven wire mesh or other suitable material. The pre-inflation diving suit dome (not shown) corresponds in function and general dimensions to dome 8 of the flying pressurized suit 1. The pre-inflation diving suit dome (not shown) may be constructed of a suitable metal, for example, and with conveniently spaced observation ports therein of a transparent material such as glass. The elastomeric material forming seals for the pre-inflation diving suit may still be formed of rubber, such rubber being of a harder consistency. Unless specifically mentioned hereinabove with regard to the pre-inflation diving suit, all parts and construction of the pre-inflation diving suit may be the same as the flying pressurized suit including the optional or alternate construction of the flying pressurized suit.

A pressurized suit designed for use in toxic, non-contaminative or intemperate atmospheres should possess desirably certain characteristics and be capable of performing certain functions as described more fully hereinafter for meeting the requirements of extended and safe service in said atmospheres. Such service may be exemplified by the occupant's manipulation of control valves for regulation of a process in an atmosphere containing toxic fumes, in an atmosphere of intense heat or cold, or in an atmosphere devoid of extraneous suit gases, for example, wherein extensive freedom and flexibility of movement is desirable and wherein undue bulkiness or weight of the suit is objectionable, and also by such actions as sitting, standing, bending, stooping, and reaching. Such service may be also exemplified wherein only portions of said suit may be utilized as in the occupant's thrusting of his hand and part of his arm into heated acid to remove objects therefrom, for example.

The toxic, non-contaminative, or intemperate pressurized suits are identical in constructional features to the flying pressurized suit with certain hereinbelow described differencs. The intemperate suit should have a more frequent change of air in the suit ventilating system to afford proper insulating qualities between the suit and the occupant during intemperate conditions. The toxic suit need maintain only a slight differential of pressure in the suit above ambient pressure, and therefore the construction of the toxic suit need not be of the ruggedness or heavier weight of either the flying pressurized suit or the pre-inflation diving suit. The intemperate suit should provide desirably enough additional insulating material (not shown), especially when the occupant's body touches said suit portions, to enable occupant comfort with less than desirable flow of ventilating fluids, that is, enhance the intemperate suit's omni-environmental qualities. Since the non-contaminative suit is similar to flying pressurized suit 1, the non-contaminative suit is fluid-tight and therefore may be used in atmospheres that cannot be contaminated by suit ventilating or breathing fluids.

Severed portions of the toxic or intemperate suit, with sealing provided to the occupant's body at the point of suit disconnection by means of an elasticized cuff bonded to said suit portion similar to the cuff portion of glove liner 86 or 149, may be utilized for various purposes; for example, a portion including the suit hips and legs and an elasticized cuff at the waist might provide wading boots for a fisherman, or a portion including the suit arm and a sealing cuff with a fluid ventilating system and glove "feel" device as hereinabove described included might provide a desirable limb protection from chemicals and temperature extremes the arm might encounter in the occupant's performing of various tasks.

The toxic suit or suit portions may be constructed of material impervious to chemical deterioration or penetration, of material that will not crack or become brittle at low temperatures, of material that will not melt or ignite at high temperatures, and of material that will remain fluid-tight at all times. And the toxic suit material should also retain the properties as described hereinabove with regard to the flying pressurized suit.

It should be readily apparent that we have provided pressurized suits formed principally of rigid members or equivalent flexible members rigid at the extremities thereof in which an effective fluid-tight seal is formed between the various relatively movable members. We have mentioned materials both specifically and in general of which the pressurized suits may be fabricated, however, it is to be understood that we do not intend to be limited to the use of any one type or category of material, but rather adapt utilitarian materials whenever possible.

The above description and drawings disclose singular embodiments of the invention, and specific language has been employed in describing the several figures. It will, nevertheless, be understood that no limitations on the scope of the invention are thereby contemplated, and that various alterations and modifications may be made such as would occur to one skilled in the art to which this invention relates.

We claim:

1. A fluid-tight universally articulated joint of unrestricted internal passage for rotatably and pivotally interconnecting two quasi-tubular structures of similar unrestricted internal passages, said joint comprising a first mentioned annular bearing, one race of said first mentioned annular bearing connected to a first mentioned structure of said tubular structures, the other race of said first mentioned bearing connected to a first mentioned pair of arms opposedly placed in co-planar arrangement, said first mentioned pair of arms being hingedly connected through a singular pivot axis by two pivot members to a second mentioned pair of arms also opposedly placed in co-planar arrangement, said second mentioned pair of arms being connected to a race of a second mentioned annular bearing, the other race of said second mentioned bearing being connected to a second mentioned structure of said tubular structures, a plurality of annular bearings circumscribing said pairs of arms and lying in spaced apart coexistent arrangement therewith and extending between said structures, inner races of said plurality of bearings each pivotally and respectively connected to said pairs of arms, outer races of said plurality of bearings each made integral with a flexible fluid-tight bag-like tubular member thereby forming radially outward extending circumferential bulges or bulged portions each of said bulges respectively between and coextensive with said plurality of bearings, said tubular member respectively secured at ends thereof to said tubular structures, whereby relative longitudinal axial rotating movement of said tubular structures occurring by means of the shearing or relative circumferential movement of one incremental annulus with respect to the adjacent annuli of said tubular member, whereby relative pivoted movement of said tubular structures occurring by pivoting about said pivot members wherein the amount of bulging of said tubular member increases on the side toward the direction of bending and decreases on the opposite side thereof, said plurality of bearings pivoting on said pairs of arms in accommodation of said bulging thereof, whereby noncoaxial or relative angular rotating movement of said tubular structures occurring by the transpositioning of said singular pivot axis wherein said pairs of arms and attendant bearing races rotate about said structures longitudinal axis in the direction of said angular rotating movement, said bulges of said tubular member respectively assuming proportionate greater or lesser amounts of bulging on the periphery thereof corresponding to the relative angular position, whereby universal relative movement of said structures occurring by combinations of the above described relative longitudinal axial rotating movement, relative pivoted movement, and non-coaxial or relative angular rotating movement.

2. A fluid-tight universally articulated joint of unrestricted internal passage for rotatably and pivotally interconnecting two quasi-tubular structures of similar unrestricted internal passages, said joint comprising a first mentioned annular bearing, one race of said first mentioned annular bearing connected to a first mentioned structure of said tubular structures, the other race of said first mentioned bearing connected to a first mentioned pair of arms oppositely placed in co-planar arrangement, said first mentioned pair of arms being hingedly connected through a singular pivot axis by two pivot members to a second mentioned pair of arms also oppositely placed in co-planar arrangement, wherein said singular pivot axis is laterally offset from the centroid of the joint cross-sectional area embracing said singular pivot axis, said cross-sectional area lying in a plane bisecting the planes in which each pair of joint arms lie, whereby said offset tending to cause a relative bent position of the interconnected tubular structures toward the side of said offset when said joint internal fluid pressure is differentially greater than the fluid without said joint, whereby the opposite differential in said fluid pressure causing said joint to bend away from side of said offset, whereby the greater the proportion of said offset, the greater the amount of relative bend of said joint, said second mentioned pair of arms being connected to a race of a second mentioned annular bearing, the other race of said second mentioned bearing being connected to a second mentioned structure of said tubular structures, a plurality of annular bearings circumscribing said pair of arms and lying in spaced apart coexistent arrangement therewith and extending between said structures, inner races of said plurality of bearings each pivotally and respectively connected to said pairs of arms, outer race of said plurality of bearings each made integral with a flexible fluid-tight bag like tubular member thereby forming radially outward extending circumferential bulges or bulged portions each of said bulges respectively between and coextensive with said plurality of bearings, said tubular member respectively secured at ends thereof to said tubular structures, whereby relative longitudinal axial rotating movement of said tubular structures occurring by means of the shearing or relative circumferential movement of one incremental annulus with respect to the adjacent annuli of said tubular member, whereby relative pivoted movement of said tubular structures occurring by pivoting about said pivot members wherein the amount of bulging of said tubular member increases on the side toward the direction of bending and decreases on the opposite side thereof, said plurality of bearings pivoting on said pairs of arms in accommodation of said bulging thereof, whereby non-coaxial or relative angular rotating movement of said tubular structures occurring by the transpositioning of said singular pivot axis wherein said pairs of arms and attendant bearing races rotate about said structures longitudinal axis in the direction of said angular rotating movement, said bulges of said tubular member respectively assuming proportionate greater or lesser amounts of bulging on the periphery thereof corresponding to the relative angular position, whereby universal relative movement of said structures occurring by combinations of the above described relative longitudinal axial rotating movement, relative pivoted movement, and non-coaxial or relative angular rotating movement.

3. A fluid-tight universally articulated joint of unrestricted internal passage for rotatably and pivotally interconnecting two quasi-tubular structures of similar unrestricted internal passages, said joint comprising a first mentioned annular bearing, one race of said first mentioned annular bearing connected to a first mentioned structure of said tubular structures, the other race of said first mentioned bearing connected to a first mentioned pair of arms oppositely placed in co-planar arrangement, said first mentioned pair of arms hingedly connected through a singular pivot axis by a first mentioned two pivot members to a second mentioned pair of arms also oppositely placed in co-planar arrangement, said second mentioned pair of arms being connected to a race of a second mentioned annular bearing, the other race of said second mentioned annular bearing being connected to a third mentioned pair of arms oppositely placed in co-planar arrangement, said third mentioned pair of arms being hingedly connected through a singular pivot axis by a second mentioned two pivot members to a fourth mentioned pair of arms also oppositely placed in co-planar arrangement, said fourth mentioned pair of arms being connected to a race of a third mentioned annular bearing, the other race of said third mentioned annular bearing being connected to a second mentioned structure of said tubular structures, a plurality of annular bearings circumscribing said pairs of arms and lying in spaced apart coexistent arrangement therewith and extending between said structures, inner races of said plurality of bearings each pivotally and respectively connected to said pairs of arms, outer race of said plurality of bearings each made integral with a flexible fluid-tight bag-like tubular member thereby forming radially outward extending circumferential bulges or bulged portions each of said bulges respectively between and coextensive with said plurality of bearings, said tubular member respectively secured at ends thereof to said tubular structures, whereby relative longitudinal axial rotating movement of said tubular structures occurring by means of the shearing or relative circumferential movement of one incremental annulus with respect to the adjacent annuli of said tubular member, whereby relative pivoted movement of said tubular structures occurring by pivoting about said pivot members wherein the amount of bulging of said tubular member increases on the side toward the direction of bending and decreases on the opposite side thereof, said plurality of bearings pivoting on said pairs of arms in accommodation of said bulging thereof, whereby noncoaxial or relative angular rotating movement of said tubular structures occurring by the transpositioning of said singular pivot axis wherein said pairs of arms and attendant bearing races rotate about said structures longitudinal axis in the direction of said angular rotating movement, said bulges of said tubular member respectively assuming proportionate greater or lesser amounts of bulging on the periphery thereof corresponding to the relative angular position, whereby universal relative movement of said structures occurring by combinations of the above described relative longitudinal axial rotating movement, relative pivoted movement, and non-coaxial or relative angular rotating movement.

4. A fluid-tight universally articulated joint of unrestricted internal passage for rotatably and pivotally interconnecting two quasi-tubular structures of similar unrestricted internal passages, said joint comprising a first mentioned annular bearing, one race of said first mentioned annular bearing connected to a first mentioned structure of said tubular structures, the other race of said first mentioned bearing connected to a first mentioned pair of arms oppositely placed in co-planar arrangement, said first mentioned pair of arms being hingedly connected through a singular pivot axis by a first mentioned two pivot members to a second mentioned pair of arms also oppositely placed in co-planar arrangement, wherein said singular pivot axis is laterally offset from the centroid of the joint cross-sectional area embracing said singular pivot axis, said cross-sectional area lying in a plane bisecting the planes in which each pair of joint arms lie, whereby said offset tending to cause a relative bent position of the interconnected tubular structures toward the side of said offset when said joint internal fluid pressure is differentially greater than the fluid without said joint, whereby the opposite differential in said fluid pressure causing said joint to bend away from side of said offset, whereby the greater the proportion of said offset, the greater the amount of relative bend of said joint, said second mentioned pair of arms being connected to a race of a second mentioned annular bearing, the other race of said second mentioned annular bearing being connected to a third mentioned pair of arms oppositely placed in co-planar arrangement, said third mentioned pair of arms being hingedly connected through a singular pivot axis by a second mentioned two pivot members to a fourth mentioned pair of arms also opposedly placed in coplanar arrangement, said fourth mentioned pair of arms being connected to a race of a third mentioned annular bearing, the other race of said third mentioned annular bearing being connected to a second mentioned structure of said tubular structures, a plurality of annular bearings circumscribing said pairs of arms and lying in spaced apart coexistent arrangement therewith and extending between said structures, inner races of said plurality of bearings each pivotally and respectively connected to said pairs of arms, outer races of said plurality of bearings each made integral with a flexible fluid-tight bag-like tubular member thereby forming radially outward extending circumferential bulges or bulged portions each of said bulges respectively between and coextensive with said plurality of bearings, said tubular member respectively secured at ends thereof to said tubular structures, whereby relative longitudinal axial rotating movement of said tubular structures occurring by means of the shearing or relative circumferential movement of one incremental annulus with respect to the adjacent annuli of said tubular member, whereby relative pivoted movement of said tubular structures occurring by pivoting about said pivot members wherein the amount of bulging of said tubular member increases on the side toward the direction of bending and decreases on the opposite side thereof, said plurality of bearings pivoting on said pairs of arms in accommodation of said bulging thereof, whereby non-coaxial or relative angular rotating movement of said tubular structures occurring by the transpositioning of said singular pivot axis wherein said pairs of arms and attendant bearing races rotate about said structures longitudinal axis in the direction of said angular rotating movement, said bulges of said tubular member respectively assuming proportionate greater or lesser amounts of bulging on the periphery thereof corresponding to the relative angular position, whereby universal relative movement of said structures occurring by combinations of the above described relative longitudinal axial rotating movement, relative pivoted movement, and non-coaxial or relative angular rotating movement.

5. A fluid-tight universally articulated joint of unrestricted internal passage for rotatably and pivotally interconnecting two quasi-tubular structures of similar unrestricted internal passages, said joint comprising a first mentioned annular bearing, one race of said first mentioned annular bearing connected to a first mentioned structure of said tubular structures, the other race of said first mentioned bearing connected to a first mentioned pair of arms opposedly placed in co-planar arrangement, said first mentioned pair of arms hingedly connected through a first mentioned singular pivot axis by a first mentioned two pivot members to a second mentioned pair of arms also opposedly placed in co-planar arrangement, wherein said first mentioned singular pivot axis is laterally offset from the centroid of the joint cross-sectional area embracing said first mentioned singular pivot axis, said second mentioned pair of arms being connected to a race of a second mentioned annular bearing, the other race of said second mentioned annular bearing being connected to a third mentioned pair of arms opposedly placed in co-planar arrangement, said third mentioned pair of arms being hingedly connected through a second mentioned singular pivot axis by a second mentioned two pivot members to a fourth mentioned pair of arms also opposedly placed in co-planar arrangement, wherein said second mentioned singular pivot axis is laterally offset from the centroid of the joint cross-sectional area embracing said second mentioned singular pivot axis, said cross-sectional area lying in a plane bisecting the planes in which each pair of joint arms lie, whereby said offset tending to cause a relative bent position of the interconnected tubular structures toward the side of said offset when said joint internal fluid pressure is differentially greater than the fluid without said joint, whereby the opposite differential is said fluid pressure causing said joint to bend away from side of said offset, whereby the greater the proportion of said offset, the greater the amount of relative bend of said joint, said fourth mentioned pair of arms being connected to a race of a third mentioned annular bearing, the other race of said third mentioned annular bearing being connected to a second mentioned structure of said tubular structures, a plurality of annular bearings circumscribing said pairs of arms and lying in spaced apart coexistent arrangement therewith and extending between said structures, inner races of said plurality of bearings each pivotally and respectively connected to said pairs of arms, outer races of said plurality of bearings each made integral with a flxible fluid-tight bag-like tubular member thereby forming radially outward extending circumferential bulges or bulged portions each of said bulges respectively between and coextensive with said plurality of bearings, said tubular member respectively secured at ends thereof to said tubular structures, whereby relative longitudinal axial rotating movement of said tubular structures occurring by means of the shearing or relative circumferential movement of one incremental annulus with respect to the adjacent annuli of said tubular member, whereby relative pivoted movement of said tubular structures occurring by pivoting about said pivot members wherein the amount of bulging of said tubular member increases on the side toward the direction of bending and decreases on the opposite side thereof, said plurality of bearings pivoting on said pairs of arms in accommodation of said bulging thereof, whereby non-coaxial or relative angular rotating movement of said tubular structures occurring by the transpositioning of said singular pivot axis wherein said pairs of arms and attendant bearings races rotate about said structures longitudinal axis in the direction of said angular rotating movement, said bulges of said tubular member respectively assuming proportionate greater or lesser amounts of bulging on the periphery thereof corresponding to the relative angular position, whereby universal relative movement of said structures occurring by combinations of the above described relative longitudinal axial rotating movement, relative pivoted movement, and non-coaxial or relative angular rotating movement.

References Cited in the file of this patent

UNITED STATES PATENTS

| Number | Name | Date |
|---|---|---|
| 578 | Taylor | June 20, 1838 |
| 236,858 | Tasker | Jan. 18, 1881 |
| 237,141 | Tasker | Feb. 1, 1881 |
| 463,477 | Boucher et al. | Nov. 17, 1891 |
| 496,686 | Hemenger | May 2, 1893 |
| 634,503 | Morrow | Oct. 10, 1899 |
| 743,115 | Ufford | Nov. 3, 1903 |
| 1,148,902 | Jacobs | Aug. 3, 1915 |
| 1,256,532 | Drag | Feb. 19, 1918 |
| 1,359,132 | Walters | Nov. 16, 1920 |
| 1,368,786 | Graff | Feb. 15, 1921 |
| 1,377,404 | Deam | May 10, 1921 |
| 1,490,470 | Laubach | Apr. 15, 1924 |
| 1,716,206 | Burden | June 4, 1929 |
| 1,888,676 | Jennings | Nov. 22, 1932 |
| 2,313,855 | Wiggins | Mar. 16, 1943 |
| 2,393,171 | Krupp | Jan. 15, 1946 |
| 2,410,632 | Colley et al. | Nov. 5, 1946 |
| 2,410,786 | Mallory | Nov. 5, 1946 |
| 2,417,177 | Richou | Mar. 11, 1947 |
| 2,421,533 | Akerman | June 3, 1947 |
| 2,433,768 | Krupp | Dec. 30, 1947 |
| 2,569,451 | Browne | Oct. 2, 1951 |
| 2,587,943 | Wiggins | Mar. 4, 1952 |
| 2,597,764 | Tucker et al. | May 20, 1952 |